(12) United States Patent
Sakai et al.

(10) Patent No.: US 11,231,279 B2
(45) Date of Patent: Jan. 25, 2022

(54) WORK MACHINE MANAGEMENT SYSTEM AND WORK MACHINE

(71) Applicant: Komatsu Ltd., Tokyo (JP)

(72) Inventors: Atsushi Sakai, Chigasaki (JP); Masanori Minagawa, Tokyo (JP); Tomonori Ozaki, Naka-gun (JP)

(73) Assignee: Komatsu LTD., Tokyo (JP)

( * ) Notice: Subject to any disclaimer, the term of this patent is extended or adjusted under 35 U.S.C. 154(b) by 0 days.

(21) Appl. No.: 16/068,959

(22) PCT Filed: Feb. 29, 2016

(86) PCT No.: PCT/JP2016/056140
§ 371 (c)(1),
(2) Date: Jul. 10, 2018

(87) PCT Pub. No.: WO2017/149628
PCT Pub. Date: Sep. 8, 2017

(65) Prior Publication Data
US 2019/0025057 A1    Jan. 24, 2019

(51) Int. Cl.
*G01C 21/00* (2006.01)
*G05D 1/02* (2020.01)
(Continued)

(52) U.S. Cl.
CPC ......... *G01C 21/005* (2013.01); *G05D 1/0212* (2013.01); *G05D 1/0219* (2013.01);
(Continued)

(58) Field of Classification Search
USPC ........................................................ 701/422
See application file for complete search history.

(56) References Cited

U.S. PATENT DOCUMENTS 8,515,612 B2 * 8/2013 Tanaka ................. G05D 1/0217
701/25
8,855,921 B2 * 10/2014 Modica ................. G06T 11/203
701/410
(Continued)

FOREIGN PATENT DOCUMENTS

JP    2001-124576 A    5/2001
JP       5731021 B1    6/2015
(Continued)

OTHER PUBLICATIONS

International Search Report dated May 31, 2016, issued for PCT/JP2016/056140.
(Continued)

*Primary Examiner* — Nicholas K Wiltey
*Assistant Examiner* — Terry C Buse
(74) *Attorney, Agent, or Firm* — Locke Lord LLP

(57) ABSTRACT

A work machine management system includes: a position detecting device that detects a position of a work machine traveling in a workplace; a non-contact sensor that detects an object existing in the workplace in a non-contact manner; map data that accumulates information on existence and a position of the object existing in the workplace on the basis of detection data obtained by the position detecting device and detection data obtained by the non-contact sensor; a travel route generation unit that generates a travel route where the work machine travels; and an identifying unit that identifies perfection of map data. The travel route generation unit generates the travel route where the work machine travels on the basis of the perfection of the map data identified by the identifying unit.

10 Claims, 15 Drawing Sheets

(51) Int. Cl.
   *G08G 1/13*    (2006.01)
   *G08G 1/137*   (2006.01)
   *G08G 1/00*    (2006.01)

(52) U.S. Cl.
   CPC ......... *G05D 1/0242* (2013.01); *G05D 1/0274* (2013.01); *G05D 1/0278* (2013.01); *G08G 1/13* (2013.01); *G08G 1/137* (2013.01); *G08G 1/20* (2013.01); *G05D 2201/0202* (2013.01)

(56) References Cited

U.S. PATENT DOCUMENTS

| | | | |
|---|---|---|---|
| 9,008,886 B2* | 4/2015 | Braunstein | E02F 9/265 |
| | | | 701/23 |
| 9,341,480 B2 | 5/2016 | Sugihara et al. | |
| 2009/0088979 A1* | 4/2009 | Koch | G05D 1/0274 |
| | | | 701/530 |
| 2009/0202109 A1 | 8/2009 | Clar et al. | |
| 2010/0063651 A1* | 3/2010 | Anderson | G05D 1/0088 |
| | | | 701/2 |
| 2011/0066313 A1* | 3/2011 | Larsson | G01C 7/06 |
| | | | 701/25 |
| 2012/0095651 A1* | 4/2012 | Anderson | G05D 1/028 |
| | | | 701/50 |
| 2014/0121881 A1* | 5/2014 | Diazdelcastillo | G05D 1/0265 |
| | | | 701/23 |
| 2015/0032293 A1* | 1/2015 | O'Neill | F41H 11/16 |
| | | | 701/2 |
| 2015/0032373 A1 | 1/2015 | Ikari | |
| 2015/0179062 A1* | 6/2015 | Ralston | G08G 1/0145 |
| | | | 701/117 |
| 2015/0201555 A1* | 7/2015 | Willgert | G05D 1/0274 |
| | | | 701/26 |
| 2015/0355333 A1 | 12/2015 | Ono et al. | |
| 2015/0361642 A1* | 12/2015 | Stratton | E02F 9/205 |
| | | | 701/461 |

FOREIGN PATENT DOCUMENTS

| | | |
|---|---|---|
| WO | 2013/122065 A1 | 8/2013 |
| WO | 2014/103989 A1 | 7/2014 |

OTHER PUBLICATIONS

Office Action dated May 13, 2019, issued for the corresponding Canadian patent application No. 3,010,702.

* cited by examiner

WORK MACHINE MANAGEMENT SYSTEM AND WORK MACHINE

FIELD

The present invention relates to a work machine management system and a work machine.

BACKGROUND

In a mining site of a mine, a mining machine may be made to travel along a set travel route. Patent Literature 1 discloses a technology of generating a route for a moving body to move from a departure point to a destination point.

CITATION LIST

Patent Literature

Patent Literature 1: Japanese Patent Application Laid-open No. 2001-124576 A

SUMMARY

Technical Problem

In a case of making a mining machine travel along a set travel route, actual positional data of a mining machine is acquired by a global positioning system (GPS) or the like, and travel of the mining machine is controlled such that a difference between a target position on the travel route and an actual position of the mining machine is minimized. However, depending on an environment of a mine, a time zone during which positional data of the mining machine is hardly acquired by the GPS or the like may be caused. When the mining machine is made to travel during such a time zone, correct positional data of the mining machine cannot be acquired, and therefore, the mining machine can hardly travel along the travel route, and productivity in the mine may be deteriorated.

An aspect of the present invention is directed to providing a work machine management system and a work machine capable of suppressing deterioration of productivity in a mine.

Solution to Problem

According to a first aspect of the present invention, a work machine management system comprising: a position detecting device configured to detect a position of a work machine traveling in a workplace; a non-contact sensor configured to detect, in a non-contact manner, an object existing in the workplace; map data configured to accumulate information on existence and a position of the object existing in the workplace on the basis of detection data obtained by the position detecting device and detection data obtained by the non-contact sensor; a travel route generation unit configured to generate a travel route where the work machine travels; and an identifying unit configured to identify perfection of the map data, wherein the travel route generation unit generates the travel route where the work machine travels on the basis of the perfection of the map data identified by the identifying unit.

According to a second aspect of the present invention, a work machine comprises the work machine management system according to the first aspect.

According to a third aspect of the present invention, a work machine management system comprises: a position detecting device configured to detect a position of a work machine traveling in a workplace; a non-contact sensor configured to detect, in a non-contact manner, an object existing in the workplace; map data configured to accumulate information on existence and a position of the object existing in the workplace on the basis of detection data obtained by the position detecting device and detection data obtained by the non-contact sensor; a travel route generation unit configured to generate a travel route where the work machine travels, the travel route including a first travel route that passes a center region from a first position to a second position in the workplace and a second travel route that passes an outer periphery region from the first position to the second position in the workplace, and a designation unit configured to designate perfection of map data in the second travel route, wherein the travel route generation unit generates a travel route so as to make the work machine preferentially pass the second travel route on the basis of information from the designation unit.

According to a fourth aspect of the present invention, a work machine management system, comprises: a position detecting device configured to detect a position of a work machine traveling in a workplace; a non-contact sensor configured to detect, in a non-contact manner, an object existing in the workplace; map data configured to accumulate information on existence and a position of the object existing in the workplace on the basis of detection data obtained by the position detecting device and detection data obtained by the non-contact sensor; a travel route generation unit configured to generate a travel route where the work machine travels, the travel route including a travel route that passes an outer periphery region from a first position to a second position in the workplace; an identifying unit configured to identify perfection of map data; a scan matching navigation position calculation unit configured to calculate a position of the work machine by matching a detection result obtained by the non-contact sensor with the map data; and a travel controller configured to control travel of the work machine on the basis of a detection result obtained by the position detecting device in a case where the position detecting device is effective, and configured to control travel of the work machine on the basis of a calculation result obtained by the scan matching navigation position calculation unit in a case where the position detecting device is not effective, wherein the travel route generation unit generates a travel route that causes the work machine to pass the travel route both in the case where the position detecting device is effective and in the case where the position detecting device is not effective.

Advantageous Effects of Invention

According to the aspects of the present invention, provided are the work machine management system and the work machine capable of suppressing deterioration of productivity in a mine.

DESCRIPTION OF EMBODIMENTS

In the following, embodiments of the present invention will be described with reference to the drawings, but the present invention is not limited thereto.

First Embodiment

<Overview of Management System of Mining Machine>

Figure 1:
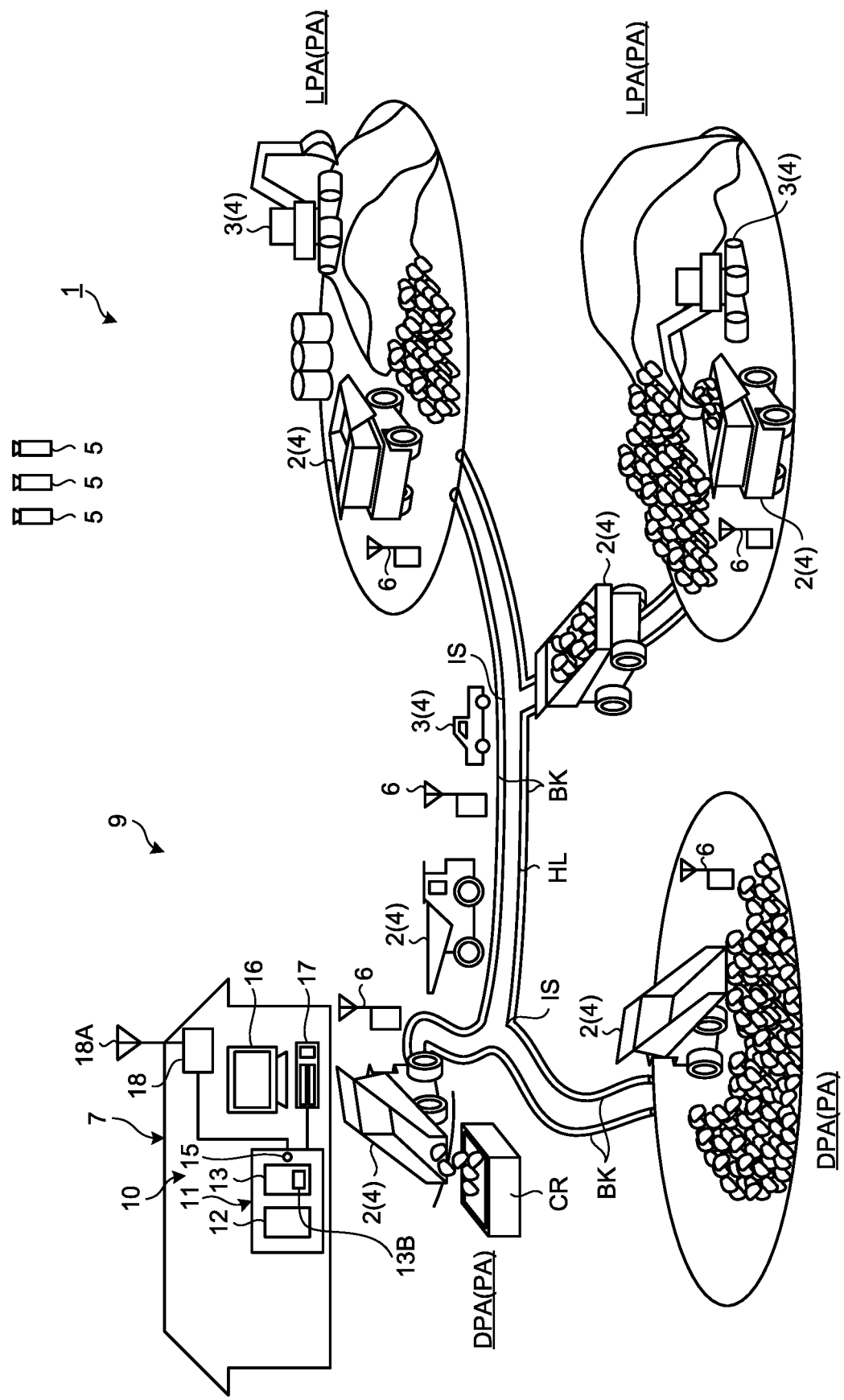
FIG. 1 is a view illustrating an exemplary management system for a mining machine according to a first embodiment.
Figure 2:
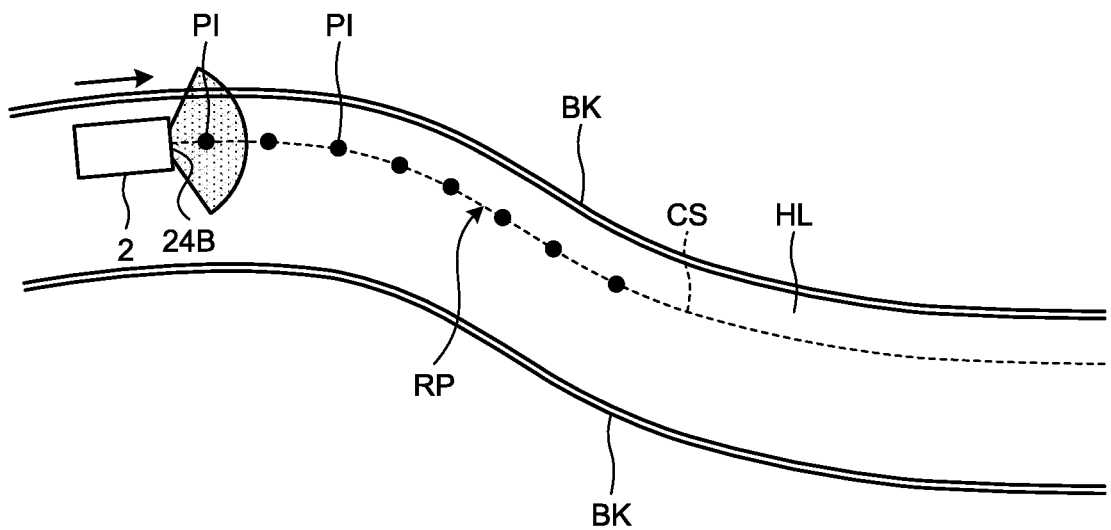
FIG. 2 is a schematic view to describe a travel route of a dump truck according to the first embodiment.

FIG. 1 is a view illustrating an exemplary management system 1 for a mining machine 4 according to a first embodiment. FIG. 2 is a plan view illustrating an exemplary mine in which the management system 1 for the mining machine 4 according to a first embodiment is applied.

The management system 1 performs management for a mining machine 4. The management for a mining machine 4 includes at least one of operational management for a mining machine 4, evaluation on productivity of a mining machine 4, evaluation on operation technique of an operator of a mining machine 4, maintenance for a mining machine 4, and abnormality diagnosis for a mining machine 4.

The mining machine 4 is a generic term for machinery used in various kinds of work in a mine. The mining machine 4 includes at least one of a loading machine, a hauling machine, a crusher, and a vehicle operated by a worker. The loading machine is a mining machine to load matters to be loaded on the hauling machine. The loading machine includes at least one of an excavator, an electric excavator, and a wheel loader. The hauling machine includes a moving body movable in a mine, such as a dump truck and also is a mining machine capable of hauling loaded matters. The loaded matters include at least one of earth, sand, and ore generated from mining work. The crusher crushes earth discharged from the hauling machine.

In the first embodiment, an example will be described in which a dump truck 2 provided as a hauling machine that can travel in a mine is managed by the management system 1. As illustrated in FIG. 1, the dump truck 2 travels in a workplace PA of the mine and at least a part of a hauling path HL leading to the workplace PA. The workplace PA is a region including at least one of the loading place LPA and the discharging place DPA excluding the hauling path HL. The hauling path HL includes an intersection IS. The dump truck 2 travels on a travel route set on the hauling path HL and on the workplace PA. An object is provided in the vicinity of the hauling path HL. In the first embodiment, it is assumed that an object provided in the vicinity of the hauling path HL is a bank BK. Meanwhile, an object provided in the vicinity of the hauling path HL may also be a side wall or an artificially manufactured structure. For example, an object may include a metal or concrete.

A dump truck 2 is a movable body movable in a mine. A travel route is set in at least a part of the loading place LPA, discharging place DPA, and hauling path HL.

The loading place LPA is an area where loading work to load matters to be loaded onto the dump truck 2 is performed. The discharging place DPA is an area where discharging work to discharge a loaded matter from the dump truck 2 is performed. A crusher CR may also be provided in at least a part of the discharging place DPA.

In the first embodiment, a dump truck 2 is a so-called unmanned dump truck that autonomously travels on a travel route on the basis of a command signal from a management device 10. Autonomous travel of the dump truck 2 represents travel in accordance with a command signal from the management device 10 without depending on operation by a worker. Meanwhile, the dump truck 2 may also be made to travel by operation of a worker.

In FIG. 1, the management system 1 includes: the management device 10 disposed in a control facility 7 constructed in a mine; a communication system 9; a dump truck 2; and a mining machine 3 that is a different mining machine 4 that differs from the dump truck 2. The management device 10 is installed in the control facility 7 of the mine and basically stationary, but the management device 10 may also be movable. The communication system 9 performs radio communication for data or command signals between the management device 10, the dump truck 2, and the different mining machine 3. The communication system 9 enables bidirectional radio communication between the management device 10 and the dump truck 2, between the management device 10 and the different mining machine 3, and between the dump truck 2 and the different mining machine 3. In the first embodiment, the communication system 9 has a plurality of repeaters 6 to relay data or command signals (radio waves and the like).

In the first embodiment, a position of the dump truck 2 and a position of the different mining machine 3 are detected by utilizing a global navigation satellite system (GNSS). The GNSS represents a global navigation satellite system. As an example of the global navigation satellite system, a GPS described above can be exemplified. The GNSS has a plurality of positioning satellites 5. The GNSS detects a position defined by coordinate data of latitude, longitude, and altitude. The position detected by the GNSS is an absolute position defined in a global coordinate system. Using the GNSS, a position of the dump truck 2 and a position of the different mining machine 3 in the mine are detected. Meanwhile, in the present specification, the term "absolute position" does not represent a position of the dump truck 2 itself but represents a highly-accurate estimated position for the real position of the dump truck 2.

In the following description, a position detected by the GNSS will be suitably referred to as a GPS position. The GPS position is an absolute position and also is coordinate data of latitude, longitude, and altitude. In the GNSS, a positioning state (accuracy of position) is changed by influence of at least one of arrangement of the positioning satellites 5, the number of the positioning satellites 5, an ionosphere, a troposphere, and a topography around an antenna that receives data from each of the positioning satellites 5. The positioning state includes, for example, a fix solution (accuracy from ±1 cm to 2 cm), a float solution (accuracy from ±10 cm to several m), a single solution (accuracy of about ±several m), and a non-positioning state (impossible to perform positioning calculation).

The management system 1 manages, in an XY coordinate system, a position and an azimuth direction of the dump truck 2 and a position and an azimuth direction (oriented direction) of the different mining machine 3 in the mine, and the XY coordinate system is defined in an X-axis direction inside a horizontal surface and a Y-axis direction orthogonal to the X-axis direction inside the horizontal surface. The azimuth direction of the dump truck 2 represents an advancing direction of the dump truck 2 that travels.

<Management Device>

Next, the management device 10 disposed in the control facility 7 will be described. The management device 10 transmits data and a command signal to a dump truck 2 and receives data from the dump truck 2. As illustrated in FIG. 1, the management device 10 includes a computer 11, a display device 16, an input device 17, and a radio communication device 18.

The computer 11 includes a processing device 12, a storage device 13, and an input/output unit (input/output interface) 15. The display device 16, input device 17, and radio communication device 18 are connected to the computer 11 via the input/output unit 15.

The processing device 12 executes various kinds of processing related to management for a dump truck 2 and various kinds of processing related to management for a different mining machine 3. The processing device 12 acquires positional data of the dump truck 2 and positional data of the different mining machine 3 via the communication system 9 in order to perform various kinds of processing.

FIG. 2 is a schematic diagram illustrating a dump truck 2 traveling on a hauling path HL. The processing device 12 sets a travel route RP where the dump truck 2 travels. The travel route RP is defined by course data CS. The course data CS is an aggregate of a plurality of points PI at each of which an absolute position (coordinate data of latitude, longitude, and altitude) is defined. In other words, a trajectory passing the plurality of points PI is a travel route RP. The processing device 12 functions as a course data creation unit that creates course data CS defining a travel route RP of a dump truck 2. The processing device 12 creates the course data CS to set the travel route RP.

The storage device 13 is connected to the processing device 12, and stores various kinds of data related to management for a dump truck 2 and various kinds of data related to management for a different mining machine 3. The storage device 13 stores positional data of the dump truck 2 and positional data of different mining machine 3.

The display device 16 can display a map including the hauling path HL and the like in the mine, positional data of the dump truck 2, and positional data of the different mining machine 3. The input device 17 includes at least one of a keyboard, a touch panel, and a mouse, and functions as an operation unit capable of inputting operation signals to the processing device 12.

The radio communication device 18 has an antenna 18A, is disposed in the control facility 7, and connected to the processing device 12 via the input/output unit 15. The radio communication device 18 is a part of the communication system 9. The radio communication device 18 can receive data transmitted from at least one of the dump truck 2 and the different mining machine 3. The data received by the radio communication device 18 is output to the processing device 12 and stored in the storage device 13. The radio communication device 18 can transmit data to at least one of the dump truck 2 and the different mining machine 3.

Figure 3:
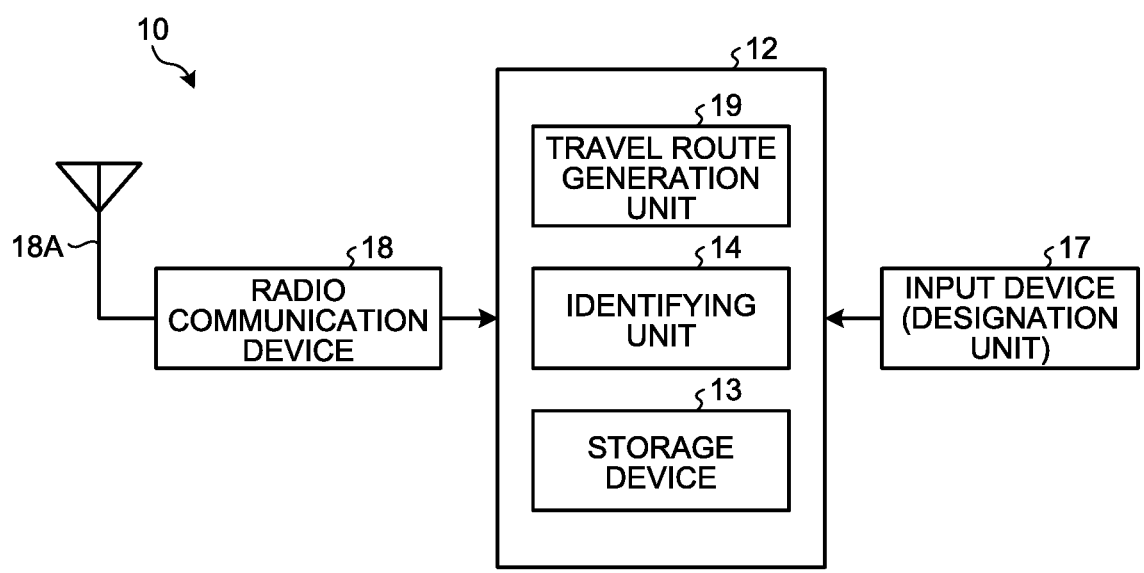
FIG. 3 is a control block diagram of a management device according to the first embodiment.

FIG. 3 is a functional block diagram of the management device 10. The management device 10 includes: a travel route generation unit 19 to generate a travel route where the dump truck 2 travels; an identifying unit 14 to identify a first area having high perfection of map data and a second area having low perfection of map data out of regions in the vicinity of the travel route where the dump truck 2 travels; the storage device 13 to store map data; and the radio communication device 18.

The computer 11 includes the input/output unit 15 for communication, an arithmetic processing device having a microprocessor such as a central processing unit (CPU) to execute a control program, an external storage device such as a read only memory (ROM) to store the control program, a main storage device (internal storage device) such as a random access memory (RAM) used as a work area of the CPU, and an external storage device (auxiliary storage device) such as a nonvolatile memory in which data is registered by the CPU. The functions of the processing device 12 are implemented by the CPU reading the control program stored in the ROM and executing the same in the work area of the RAM. The functions of the storage device 13 are implemented by the ROM storing the control program and having the data registered in the nonvolatile memory by the CPU. The nonvolatile memory includes at least one of a flash memory and a hard disk drive, and implements a database 13B. Note that the functions of the processing device 12 and the storage device 13 may also be implemented by cooperation of a plurality of processing circuits.

<Different Mining Machine>

Next, a different mining machine 3 will be described. The different mining machine 3 is a mining machine other than a dump truck 2 and actuated by operation of a worker. The different mining machine 3 includes: a processing device that includes a CPU and executes various kinds of processing related to work content; a GPS receiver that detects a GPS position; and a radio communication device that exchanges data with the radio communication device 18 of the control facility 7. The different mining machine 3 transmits a GPS position of an own machine to the radio communication device 18 of the control facility 7 at a predetermined time interval.

<Dump Truck>

Figure 4:
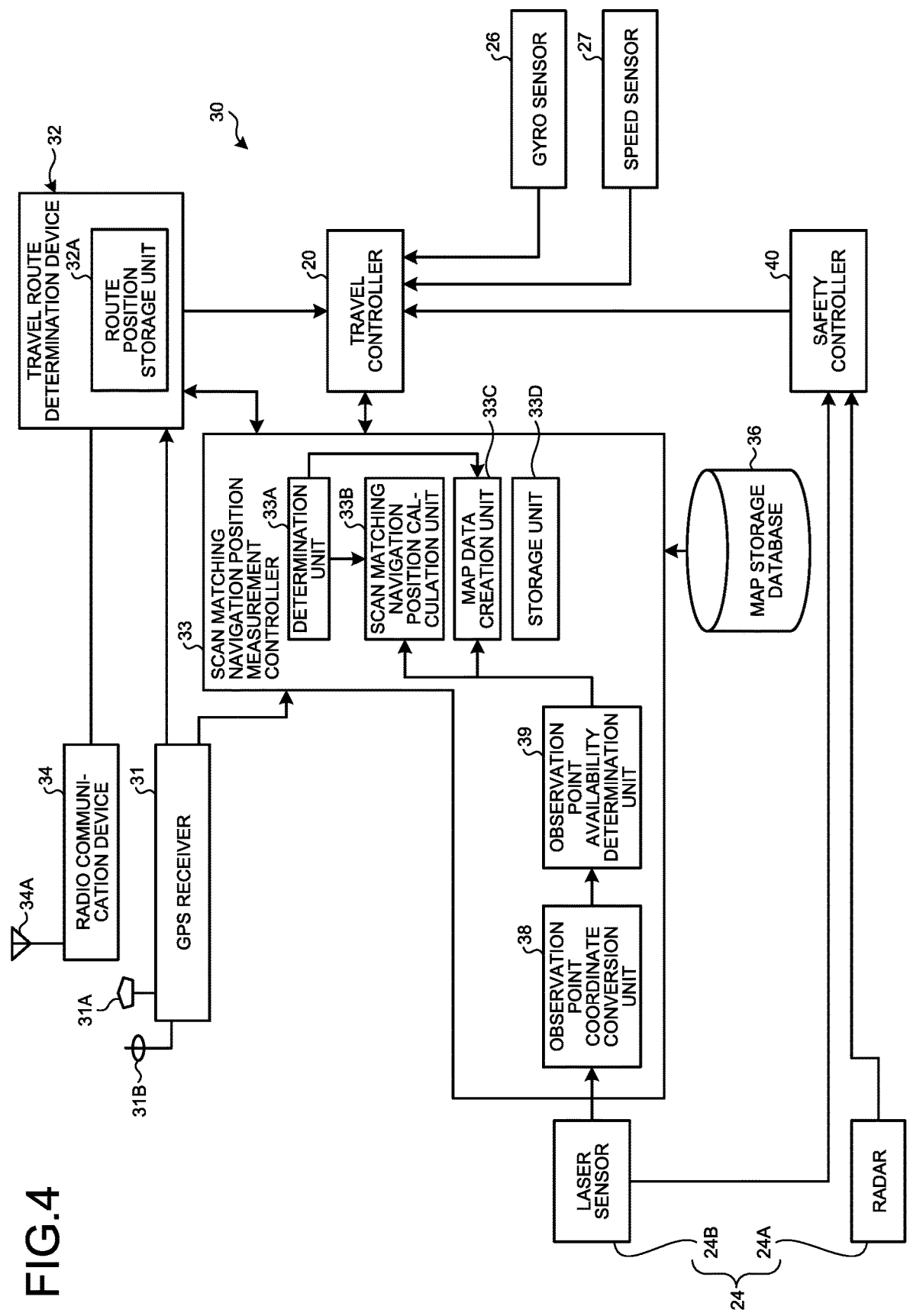
FIG. 4 is a control block diagram of a dump truck according to the first embodiment.
Figure 5:
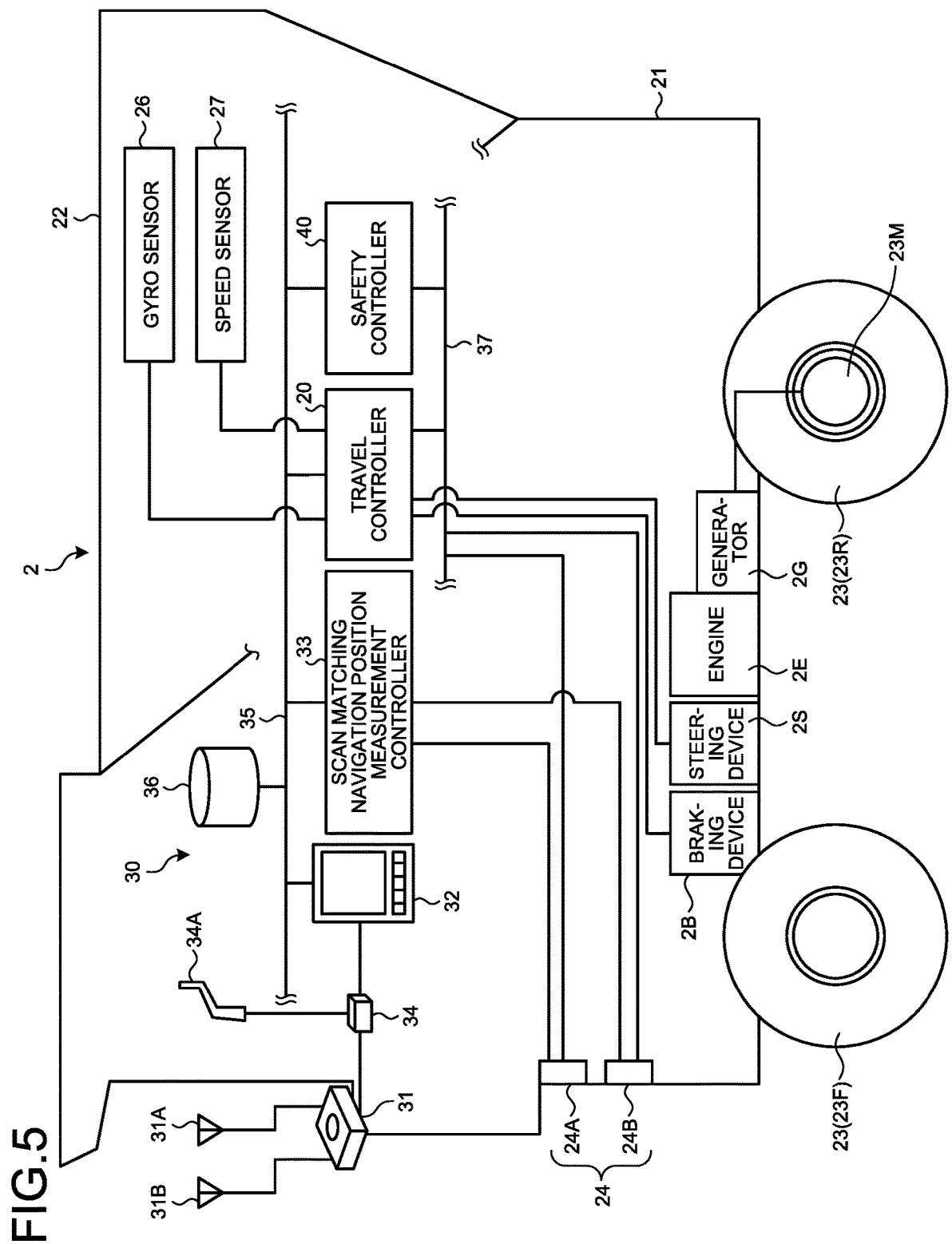
FIG. 5 is a hardware configuration diagram of the dump truck according to the first embodiment.
Figure 6:
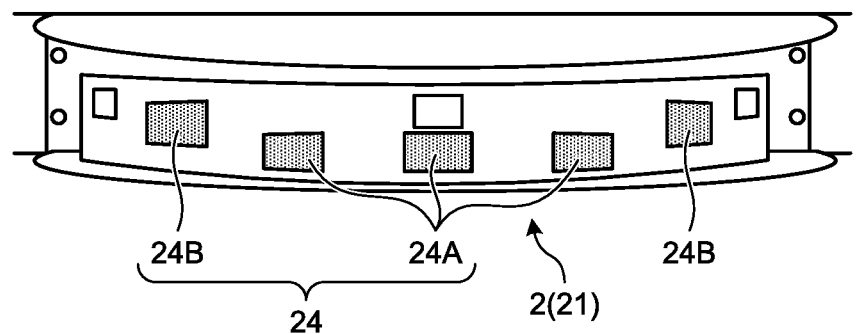
FIG. 6 is a front view of an obstacle sensor of the dump truck according to the first embodiment.
Figure 7:
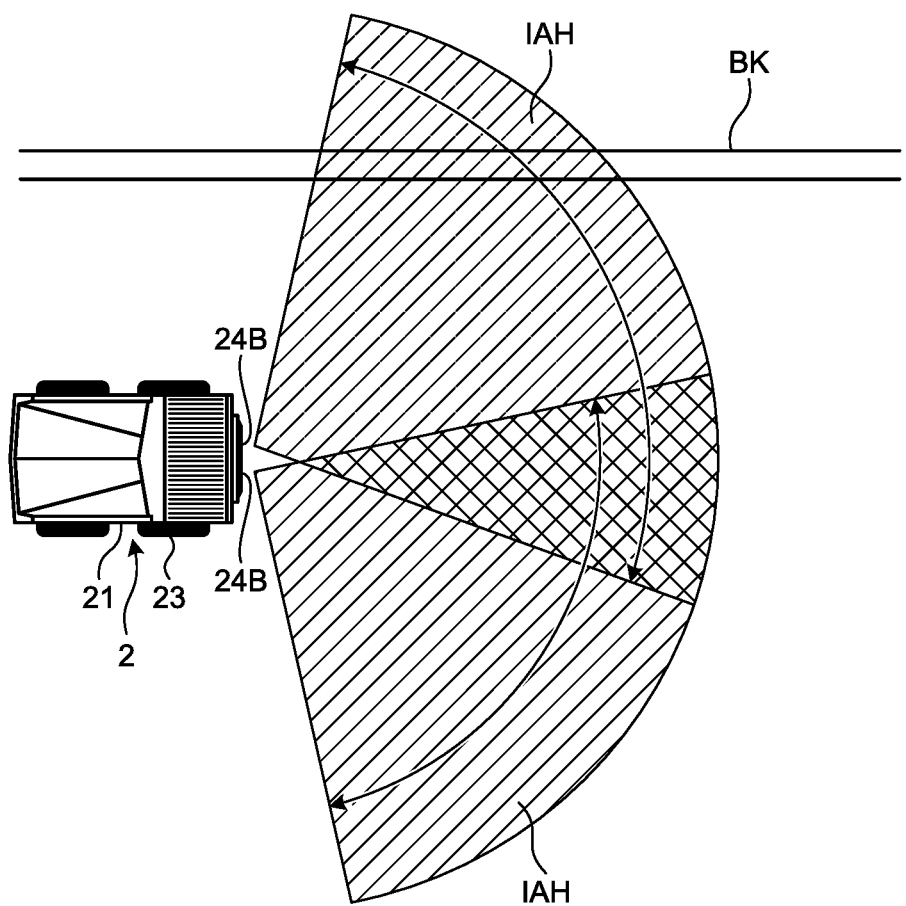
FIG. 7 is a plan view illustrating a detection area by a non-contact sensor.
Figure 8:
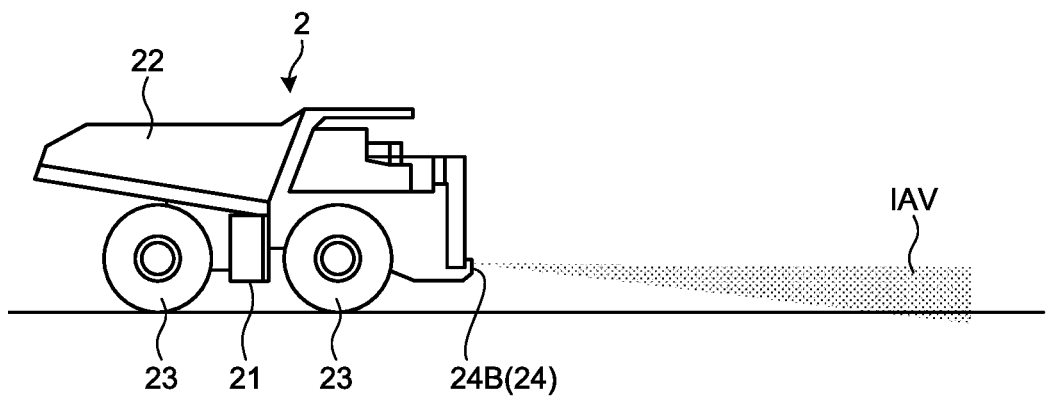
FIG. 8 is a side view illustrating a detection area by the non-contact sensor.

Next, a dump truck 2 will be described. FIG. 4 is a control block diagram of the dump truck 2 according to the first embodiment. FIG. 5 is a hardware configuration diagram of the dump truck 2 according to the first embodiment. FIG. 6 is a front view of a non-contact sensor 24 of the dump truck 2 according to the first embodiment. FIG. 7 is a plan view illustrating a detection area by a laser sensor 24B of the non-contact sensor 24. FIG. 8 is a side view illustrating a detection area by the laser sensor 24B of the non-contact sensor 24.

As illustrated in FIG. 4, a control system 30 includes at least a travel controller 20, a travel route determination device 32, a scan matching navigation position measurement controller 33, and a safety controller 40. Furthermore, the travel controller 20 can receive signals from a gyro sensor 26 and a speed sensor 27. The travel route determination device 32 can receive signals from a GPS receiver 31 and a radio communication device 34. The scan matching navigation position measurement controller 33 can receive signals or data from the non-contact sensor 24 and a map storage database 36. The safety controller 40 can receive a signal from the non-contact sensor 24. Additionally, the scan matching navigation position measurement controller 33 includes a determination unit 33A, a scan matching navigation position calculation unit 33B, a map data creation unit 33C, a storage unit 33D, an observation point coordinate conversion unit 38, and an observation point availability determination unit 39.

As illustrated in FIG. 5, a dump truck 2 includes a vehicle body 21, a vessel 22, wheels 23, the non-contact sensor 24, and the control system 30. The vehicle body 21 is provided with an engine 2E like a diesel engine, a generator 2G actuated by the engine 2E, and an electric motor 23M actuated by electric power generated by the generator 2G. The wheels 23 include front wheels 23F and rear wheels 23R. The rear wheels 23R are driven by the electric motor 23M. Meanwhile, power of the engine 2E may be transmitted to the rear wheels 23R via a transmission including a torque converter. Additionally, the vehicle body 21 is provided with a steering device 2S to steer the front wheels 23F. On the vessel 22, matters to be loaded are loaded by a loading machine. In discharging work, the vessel 22 is lifted and the loaded matters are discharged from the vessel 22.

As illustrated in FIG. 6, the non-contact sensor 24 is disposed at a lower portion of a front portion of the vehicle body 21. The non-contact sensor 24 detects an object around a dump truck 2 in a non-contact manner. The object around the dump truck 2 includes an object (bank BK, side wall, or the like) existing in the vicinity of a travel route RP. The non-contact sensor 24 functions as an obstacle sensor to detect an obstacle ahead of the dump truck 2 in a non-contact manner.

The non-contact sensor 24 can detect a relative position of an object with respect to the non-contact sensor 24 (dump truck 2). The non-contact sensor 24 includes a radar 24A and a laser sensor 24B. The laser sensor 24B has resolution performance higher than resolution performance of the radar 24A.

The radar 24A emits radio waves, irradiates an object with the radio waves, and receives radio waves reflected at the object. Thus, the radar 24A can detect a direction and a distance of the object with respect to the radar 24A. In the first embodiment, three radars 24A are provided in a manner spaced from each other in a lateral direction of the vehicle body 21.

The laser sensor 24B emits laser beams, irradiates the object with the laser beams, and receives laser beams reflected at the object. Consequently, the laser sensor 24B can detect a direction and a distance of the object with respect to the laser sensor 24B. In the first embodiment, two laser sensors 24B are provided in a manner spaced from each other in the lateral direction of the vehicle body 21.

Each of the two laser sensors 24B emits a plurality of laser beams having different azimuth directions in an up-down direction (vertical direction), and laterally swings each of the plurality of laser beams such that a beam irradiation area IAH of the laser beams is set at a predetermined angle in the lateral direction (horizontal direction). As illustrated in FIG. 7, the two laser sensors 24B swing the laser beams such that irradiation areas IAH of the laser beams emitted from the two laser sensors 24B mutually overlap at a center in the lateral direction. As illustrated in FIG. 8, each of the laser sensors 24B irradiates, with the laser beams, an irradiation area IAV inclined downward from the vehicle body 21. The irradiation areas IAH and IAV of the laser beams are detection areas of an object and the like detected by the laser sensors 24B. During travel of the dump truck 2, an installation position of each of the laser sensors 24B and an irradiation area with the laser beams are determined such that an object (bank BK) in the vicinity of the travel route RP is arranged in the detection area of the laser sensors 24B. Meanwhile, an irradiation range of a radar 24A is also defined, but illustration of the irradiation range is omitted in FIGS. 7 and 8.

The non-contact sensors 24 including the radars 24A and the laser sensors 24B are connected to the scan matching navigation position measurement controller 33 via a second communication line 37 control system of the control system 30.

<Control System>

Figure 9:
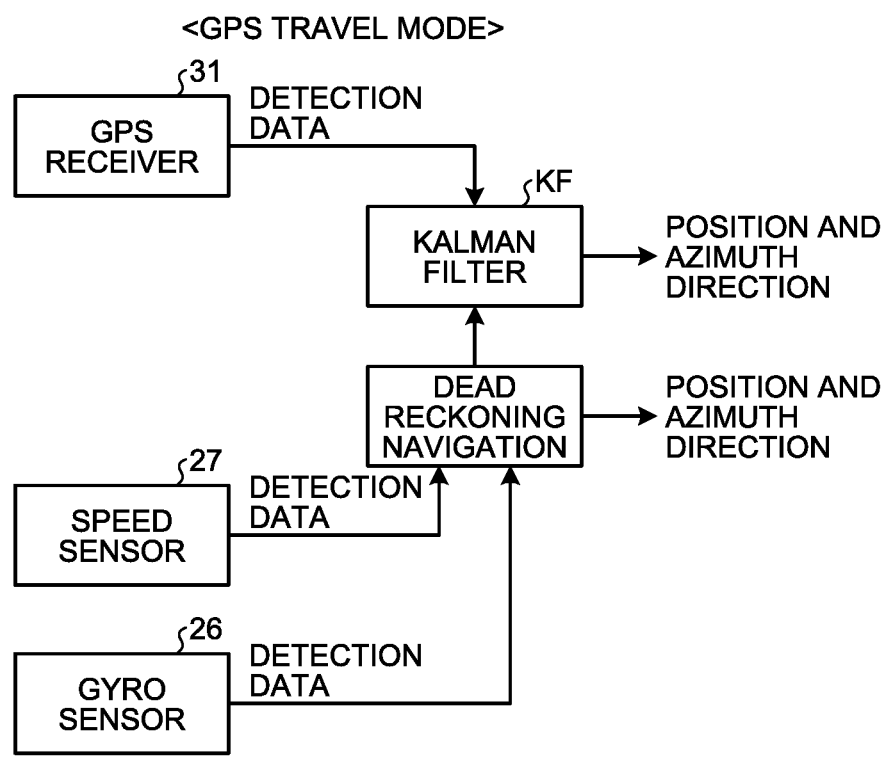
FIG. 9 is a diagram to describe a method in which a travel controller of a control system according to the first embodiment detects a position and an azimuth direction during a GPS travel mode.
Figure 10:
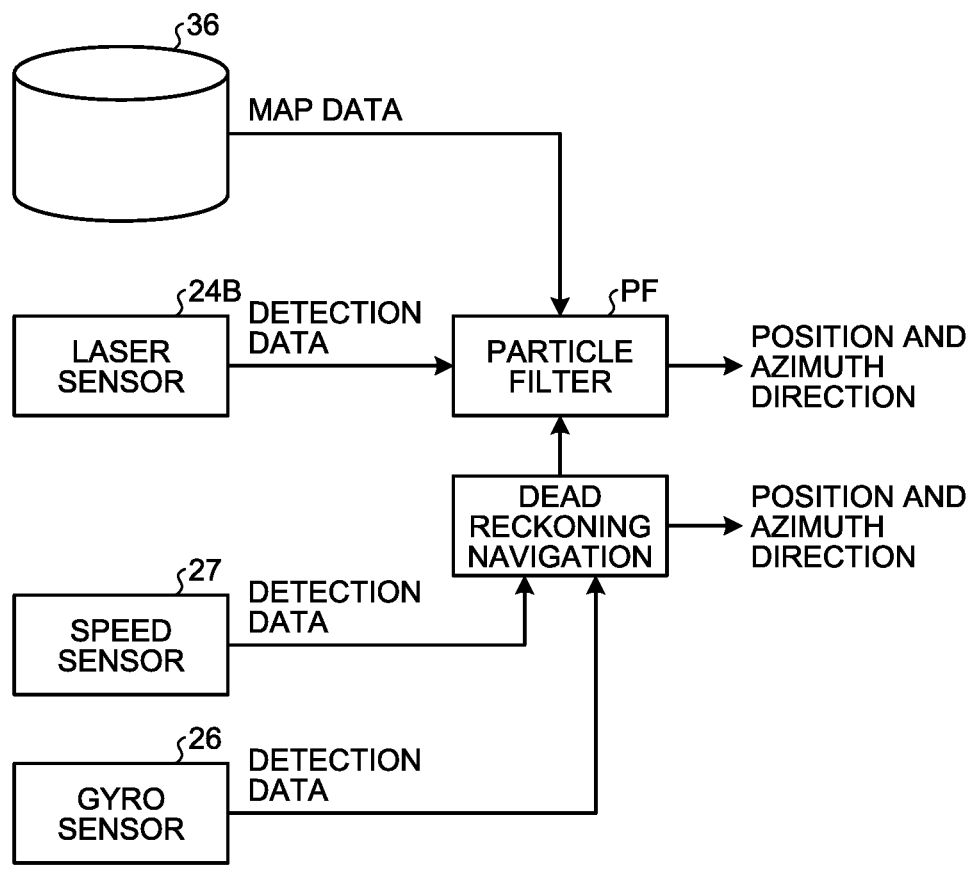
FIG. 10 is a diagram to describe a method in which the travel controller of the control system according to the first embodiment detects a position and an azimuth direction during scan matching navigation travel mode.
Figure 13:
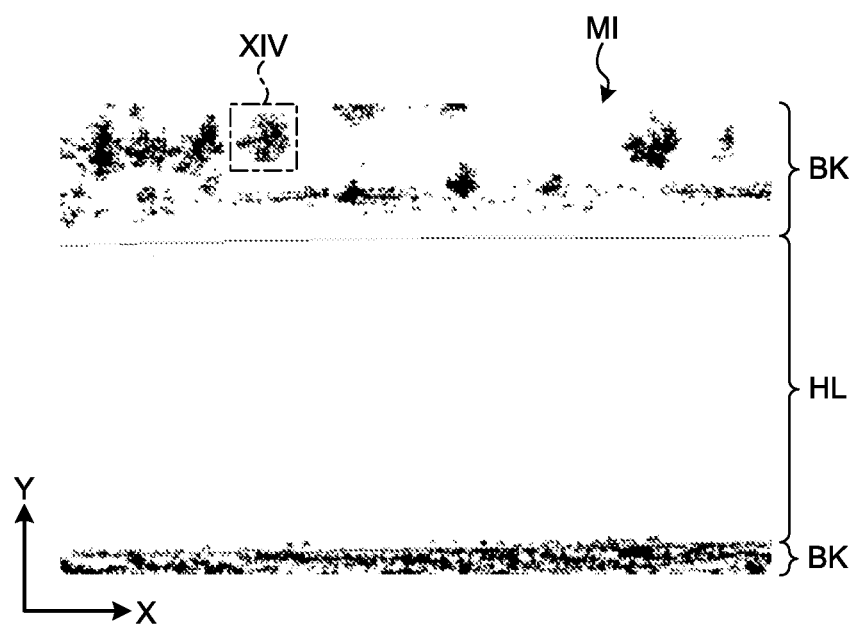
FIG. 13 is a diagram illustrating a part of map data stored in a map storage database of the control system according to the first embodiment.
Figure 14:
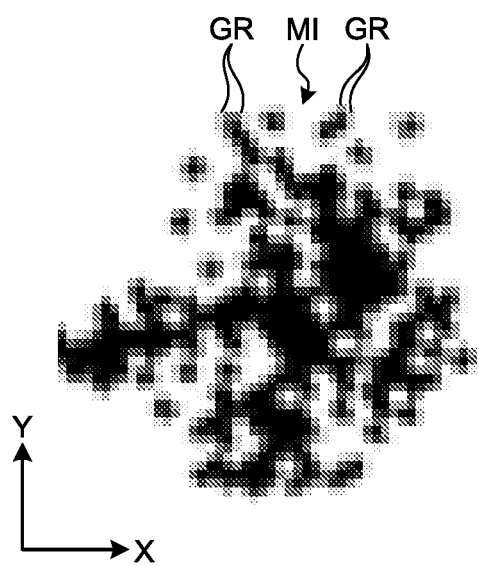
FIG. 14 is an enlarged view of a portion XIV in FIG. 13.

Next, the control system 30 will be described. FIG. 9 is a diagram to describe a method in which the travel controller 20 of the control system 30 according to the first embodiment calculates a position and an azimuth direction in a GPS travel mode. FIG. 10 is a diagram to describe a method in which the scan matching navigation position calculation unit 33B of the scan matching navigation position measurement controller 33 of the control system 30 according to the first embodiment calculates a position and an azimuth direction in a scan matching navigation travel mode. FIG. 13 is a diagram illustrating a part of map data MI stored in the map storage database 36 of the control system 30 according to the first embodiment. FIG. 14 is an enlarged view of a portion XIV in FIG. 13.

The control system 30 is installed in a dump truck 2. The control system 30 causes the dump truck 2 to autonomously travel along a travel route RP. As illustrated in FIG. 5, the control system 30 includes the gyro sensor 26, speed sensor 27, GPS receiver 31, travel route determination device 32, scan matching navigation position measurement controller 33, travel controller 20, non-contact sensors 24, radio communication device 34, and map storage database 36. Additionally, the control system 30 includes a first communication line 35, the second communication line 37, and the safety controller 40.

As illustrated in FIG. 5, the travel controller 20, travel route determination device 32, scan matching navigation position measurement controller 33, map storage database 36, and safety controller 40 are connected to the first communication line 35, and perform data communication via the first communication line 35. The travel controller 20 and the safety controller 40 are also connected to the second communication line 37, and perform data communication via the second communication line 37.

The gyro sensor 26 detects an azimuth direction (change amount in azimuth direction) of the dump truck 2. The gyro sensor 26 is connected to the travel controller 20, and outputs detection data to the travel controller 20. The travel controller 20 calculates an azimuth direction (change amount in azimuth direction) of the dump truck 2 on the basis of the detection data obtained by the gyro sensor 26.

The speed sensor 27 detects a rotational speed of the wheels 23 and detects a travel speed of the dump truck 2. The speed sensor 27 is connected to the travel controller 20 and outputs detection data to the travel controller 20. The travel controller 20 calculates a moved distance of the dump truck 2 on the basis of the detection data obtained by the speed sensor 27 and time data measured by a timer built inside the travel controller 20.

The GPS receiver 31 is provided in the dump truck 2 and detects an absolute position (GPS position) of a dump truck 2. An antenna 31A that receives data from a positioning satellite 5 is connected to the GPS receiver 31. The antenna 31A outputs, to the GPS receiver 31, a signal based on the data received from the positioning satellite 5. The GPS receiver 31 detects a position (GPS position) of the antenna 31A by using the data from the positioning satellite 5.

In the course of detecting the position of the antenna 31A, the GPS receiver 31 detects that a detected GPS position has a fix solution, a float solution, or a single solution to indicate detection accuracy thereof.

In a case of detecting any one of a fix solution, a float solution, and a single solution to indicate accuracy of a detected GPS position, the GPS receiver 31 outputs, together with accuracy of the detected GPS position, a positioning signal indicating a fact that that the GPS position is subjected to positioning calculation. In a case where the GPS position cannot be subjected to positioning calculation, the GPS receiver 31 outputs a non-positioning signal indicating a non-positioning state. The positioning signal or the non-positioning signal is output to the travel controller 20 and the scan matching navigation position measurement controller 33 via the travel route determination device 32. In the first embodiment, in a case where accuracy of a GPS position is a fix solution, the dump truck 2 can perform autonomous travel on the basis of the detected GPS position. In a case where accuracy of a GPS position is a float solution and a single solution or in a case where a GPS position cannot be subjected to positioning calculation, the dump truck 2 cannot autonomously travel on the basis of the detected GPS position.

As illustrated in FIG. 4, the travel route determination device 32 is connected to the radio communication device 34 to which an antenna 34A is connected. The radio communication device 34 can receive a command signal or data transmitted from at least one of the management device 10 and a different mining machine 4 other than the own vehicle. The mining machine 4 other than the own vehicle includes: a mining machine 4 other than a dump truck 2, such as a boring machine, an excavating machine, a loading machine, a hauling machine, and a vehicle operated by a worker; and a dump truck 2 other than the own vehicle.

The radio communication device 34 receives a command signal transmitted from the radio communication device 18 of the control facility 7 and outputs the same to the travel controller 20 and the scan matching navigation position measurement controller 33 via the travel route determination device 32. The command signal includes travel condition data indicating travel conditions of the dump truck that is the own vehicle. The travel condition data includes course data generated by the processing device 12 and travel speed data of the dump truck 2. The course data of the own vehicle is defined in the XY coordinate system. The travel route determination device 32 receives the course data from the radio communication device 34 and stores the same in a route position storage unit 32A. Furthermore, the travel route determination device 32 transmits positional data and azimuth direction data of the dump truck 2 that is the own vehicle to the radio communication device 18 of the control facility 7 via the radio communication device 34. Additionally, the travel route determination device 32 is connected to the first communication line 35, and transmits command signals to various controllers such as the scan matching navigation position measurement controller 33 and travel controller 20.

The travel route determination device 32 includes an input/output unit for communication, an arithmetic processing device having a microprocessor such as a central processing unit (CPU) to execute a control program, a main storage device (internal storage device) such as a random access memory (RAM) used as a work area of the arithmetic processing device, an external storage device (auxiliary storage device) such as a read only memory (ROM) to store the control program, and an external storage device (auxiliary storage device) such as a nonvolatile memory in which data is registered by the arithmetic processing device. The functions of the travel route determination device 32 are implemented by the arithmetic processing device reading the control program stored in the external storage device and executing the same in the work area of the main storage device. The route position storage unit 32A is implemented by an external storage device and an external storage device. The external storage device includes at least one of a flash memory and a hard disk drive. Note that the functions of the travel route determination device 32 may also be implemented by cooperation of a plurality of processing circuits.

<Travel Controller>

The travel controller 20 includes a central processing unit (CPU), a read only memory (ROM) to store a control program, a random access memory (RAM) used as a work area of the CPU, and a nonvolatile memory. As described later, the travel controller 20 receives positional data indicating a GPS position of a dump truck 2 detected by the GPS receiver 31 and positional data indicating an absolute position of the dump truck 2 calculated by the scan matching navigation position calculation unit 33B of the scan matching navigation position measurement controller 33, and causes the dump truck 2 to autonomously travel along a travel route RP defined by course data on the basis of at least one of these two kinds of positional data.

The travel controller 20 acquires not only the positional data of the dump truck 2 but also azimuth direction data indicating an azimuth direction (change amount in azimuth direction) of the dump truck 2, namely, detection data obtained by the gyro sensor 26, and travel speed data indicating a travel speed of the dump truck 2, namely, detection data obtained by the speed sensor 27 in order to cause the dump truck 2 to autonomously travel along the travel route RP.

In the first embodiment, the dump truck 2 travels along the travel route RP in exclusively two travel modes. As illustrated in FIG. 9, a first travel mode is the GPS travel mode in which the dump truck 2 is made to autonomously travel on the basis of data of a position and an azimuth direction estimated by a dead reckoning navigation using detection data obtained by the GPS receiver 31, detection data obtained by the gyro sensor 26, and detection data 27 obtained by the speed sensor 27. In a case of causing the dump truck 2 to travel in the GPS travel mode, map data creation processing described later is executed, and map data MI created in the map data creation processing is stored/updated in the map storage database 36 as necessary. As illustrated in FIG. 10, a second travel mode is a scan matching navigation travel mode in which: data of a position and an azimuth direction indicating an absolute position of the dump truck 2 is calculated by using a method called scan matching navigation on the basis of the map data MI created/updated during the GPS travel mode and detection data obtained by a laser sensor 24B; and the dump truck 2 is made to autonomously travel on the basis of the calculated data of the position and the azimuth direction of the dump truck 2. In the scan matching navigation travel mode, the data of the position and the azimuth direction of the dump truck 2 are calculated by the scan matching navigation position calculation unit 33B.

The dead reckoning navigation is a navigation in which current position and azimuth direction of a subject (dump truck 2) are estimated on the basis of an azimuth direction (change amount in azimuth direction) and a moved distance (speed) from a known position. The azimuth direction (change amount in azimuth direction) of the dump truck 2 is detected by using the gyro sensor 26 disposed in the dump truck 2. The moved distance (speed) of the dump truck 2 is detected by using the speed sensor 27 disposed in the dump truck 2. A detection signal from the gyro sensor 26 and a detection signal from the speed sensor 27 are output to the travel controller 20 of the dump truck 2.

The travel controller 20 generates a control amount related to travel of the dump truck 2 while continuing updating a current position of the dump truck 2 estimated at a predetermined time interval by using the dead reckoning navigation method on the basis of a detection signal from the gyro sensor 26 and a detection signal from the speed sensor 27 such that the dump truck 2 travels in accordance with course data set for the travel route RP. The control amount includes an accelerator signal, a braking signal, and a steering signal. The travel controller 20 controls travel (operation) of the dump truck 2 on the basis of the steering signal, accelerator signal, and braking signal.

However, estimation of a position and an azimuth direction of the own vehicle by the dead reckoning navigation is likely to cause an error due to slight slipping of a tire or the like. In other words, when a travel distance of the dump truck 2 by the dead reckoning navigation becomes long, a large amount of errors may be caused between a position estimated (estimated position) and an actual position due to accumulation of detection errors in one or both of the gyro sensor 26 and the speed sensor 27. As a result, the dump truck 2 may travel in a manner deviated from the course data generated by the processing device 12.

In the GPS travel mode, the travel controller 20 corrects a position (estimated position) of the dump truck 2 calculated (estimated) by the dead reckoning navigation using GPS positional data and azimuth direction data detected at the predetermined time interval by the GPS receiver 31 (for example, a direction indicating a line that connects currently-detected GPS positional data and previously-detected GPS positional data can be used as the azimuth direction data), thereby making the dump truck 2 travel while suppressing an amount of errors accumulated by the dead reckoning navigation from becoming excessively large. In the scan matching navigation travel mode also, the travel controller 20 corrects a position (estimated position) and an azimuth direction (estimated azimuth direction) of the dump truck 2 calculated (estimated) by the dead reckoning navigation using scan matching navigation positional data and azimuth direction data calculated at the predetermined time interval by the scan matching navigation position calculation unit 33B, thereby making the dump truck 2 travel while suppressing an amount of errors accumulated by the dead reckoning navigation from becoming excessively large.

Figure 11:
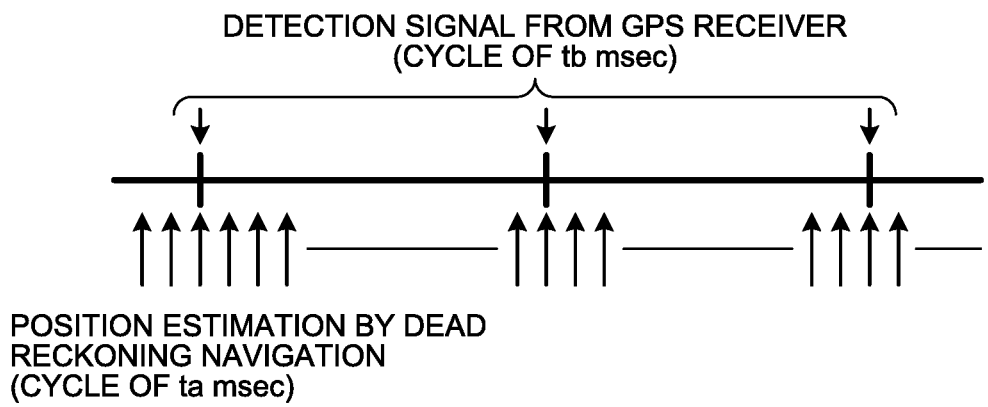
FIG. 11 is a diagram to describe a method in which a scan matching navigation position calculation unit of a position measurement controller of the control system according to the first embodiment calculates a position and an azimuth direction during the GPS travel mode.
Figure 12:
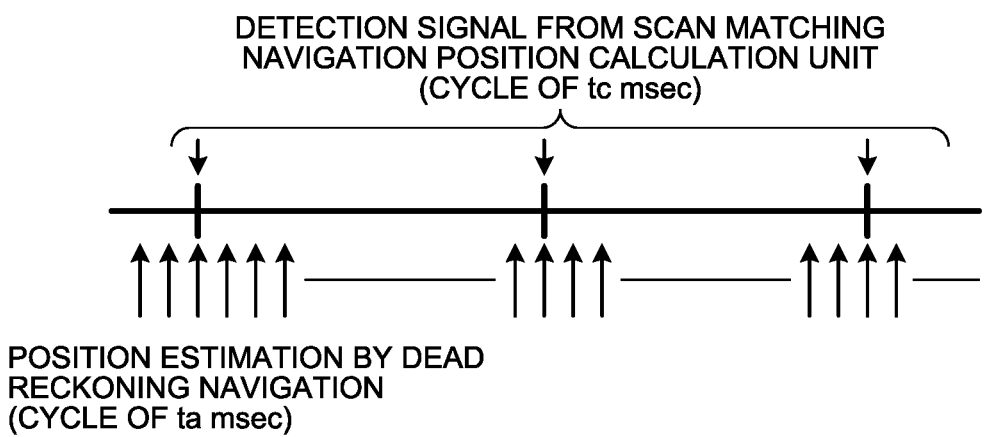
FIG. 12 is a diagram to describe a method in which the scan matching navigation position calculation unit of the position measurement controller of the control system according to the first embodiment calculates a position and an azimuth direction during the scan matching navigation mode.

As illustrated in a lower portion in each of FIGS. 11 and 12, the travel controller 20 sets, to ta [msec], a cycle of estimating a current position of the dump truck 2 by the dead reckoning navigation on the basis of detection results obtained by the gyro sensor 26 and the speed sensor 27. Additionally, as illustrated in FIG. 11, a detection signal indicating a GPS position corresponding to a detection result obtained by the GPS receiver 31 is received in the travel controller 20 every tb [msec]. As illustrated in FIG. 11, a frequency of estimating a position by the dead reckoning navigation is higher than a frequency with which a detection signal from the GPS detector 31 is received in the travel controller 20, that is, a frequency with which a GPS position is detected. Therefore, every time position is estimated by the dead reckoning navigation several times, a GPS position is received in the travel controller 20 and a current position of the dump truck 2 is corrected, and therefore, an amount of errors caused by the dead reckoning does not become excessively large.

Furthermore, as illustrated in FIG. 12, positional data indicating a position and an azimuth direction of the dump truck 2, namely, a calculation result of the scan matching navigation position calculation unit 33B is received in the travel controller 20 every tc [msec]. As illustrated in FIG. 11, the frequency of estimating a position by the dead reckoning navigation is higher than a frequency with which a calculation result of the scan matching navigation position calculation unit 33B is received in the travel controller 20, that is, a frequency with which a scan matching navigation position is calculated. Therefore, every time position estimation by the dead reckoning navigation is performed several times, positional data obtained by the scan matching navigation position calculation unit 33B is received in the travel controller 20 and a current position of the dump truck 2 is corrected, and therefore, an amount of errors caused by the dead reckoning does not become excessively large.

Meanwhile, according to FIGS. 11 and 12, adopted is the frequency with which a detection signal indicating a GPS position, and positional data obtained by the scan matching navigation position calculation unit 33B are received in the travel controller 20 every time the dead reckoning navigation is performed several times, but a frequency of performing the dead reckoning navigation may also be set similar to a frequency with which a detection signal indicating a GPS position and positional data obtained by the scan matching navigation position calculation unit 33B are received in the travel controller 20.

A concrete GPS travel mode will be described with reference to FIG. 9. The travel controller 20 calculates a position and an azimuth direction of the dump truck 2 by the dead reckoning navigation using detection data obtained by the speed sensor 27 and detection data obtained by the gyro sensor 26. Additionally, in a case where detection data obtained by the GPS receiver 31 is received in the travel controller 20, more accurate position and azimuth direction are calculated by integrating, using a Kalman filter KF, the position and azimuth direction of the dump truck 2 calculated by the dead reckoning navigation with the detection data obtained by the GPS receiver 31, and such position and azimuth direction are adopted as current position and azimuth direction of the dump truck 2.

<Scan Matching Navigation Position Measurement Controller>

As illustrated in FIG. 4, the scan matching navigation position measurement controller 33 includes the determination unit 33A, scan matching navigation position calculation unit 33B, map data creation unit 33C, and storage unit 33D.

The scan matching navigation position measurement controller 33 is connected to the first communication line 35 and acquires, via the first communication line 35 and the travel controller 20, detection data obtained by the gyro sensor 26 and detection data obtained by the speed sensor 27. Additionally, the scan matching navigation position measurement controller 33 is connected to the GPS receiver 31 via the radio communication device 34, travel route determination device 32, and first communication line 35, and acquires detection data obtained by the GPS receiver 31.

The determination unit 33A determines whether accuracy of a GPS position detected by the GPS receiver 31 exceeds predetermined accuracy. For example, the determination unit 33A determines whether a solution of a GPS position is a fix solution. In a case where a solution of a GPS position is a fix solution, the determination unit 33A determines that accuracy of the detected GPS position of the dump truck 2 is highly accurate (in this case, the GPS travel mode is selected as a travel mode in the travel controller 20). In a case where a solution of a GPS position is a float solution or a single solution, or a GPS position is a non-positioning state, the determination unit 33A determines that accuracy of the detected GPS position of the dump truck 2 is low accurate (in this case, the scan matching navigation travel mode is selected as the travel mode in the travel controller 20). Meanwhile, the predetermined accuracy is accuracy of a GPS position with which the dump truck 2 can autonomously travel along a travel route RP by the dead reckoning navigation described later. In the first embodiment, the GPS receiver 31 detects a GPS position and a solution, but another apparatus (such as the determination unit 33A) may also detect a solution.

When the determination unit 33A determines that accuracy of a GPS position of a dump truck 2 detected by the GPS receiver 31 exceeds the predetermined accuracy, in other words, determines that the accuracy is high (during the GPS travel mode), the map data creation unit 33C detects existence of at least one or more banks BK and a position thereof provided outside a loading place LPA, outside a discharging place DPA, and outside a hauling path HL on the basis of a position and an azimuth direction of the dump truck 2 calculated by the above-described method and a detection result obtained by a laser sensor 24B, and stores and accumulates data on existence and a position of the bank BK in the map storage database 36 as map data MI of the travel route RP as necessary. The map data creation unit 33C integrates the position and azimuth direction of the dump truck 2 with a detection result obtained by a laser sensor 24B, and detects existence and a position of a bank BK by deleting, from the integrated data, detection results other than the bank BK (such as various kinds of noise, ground surface, and the like). Also, the map data creation unit 33C performs saving in the map storage database 36. Note that the map storage database 36 may be stored in the storage device 13 of the management device 10. In this case, map data created by the map data creation unit 33C in the dump truck 2 is transmitted to the map storage database 36 via the communication system 9.

Map data MI illustrated in FIG. 12 represents a detection result of banks BK in a region around a hauling path HL. The hauling path HL is indicated by a blank region extending in an x direction and located in a center portion of FIG. 12, and the banks BK are indicated by regions sparsely colored in black and white in an upper portion and a lower portion of FIG. 12. As illustrated in FIGS. 13 and 14, the map data MI indicates, in the plan view: a position in the XY coordinate system formed of grids GR that section a mine by a predetermined size; and whether any bank BK exists in each of the grids GR. Each of the grids GR of the map data MI includes binary data (1 bit data), that is, "0" or "1" to indicate whether any bank BK exists. As illustrated in FIGS. 13 and 14, in the first embodiment, when there is a bank BK, each of the grids GR in the map data MI is indicated by a black square as "1" in the drawing, and when there is no bank BK, each of the grid GR is indicated by a white square as "0" in the drawing. Note that map data may be prepared not only as binary data having only values of "0" and "1" but also as continuous values from 0 to 1 (such as 0.5). For example, a value may be gradually incremented from 0 to 1 while setting 1 as an upper limit on the basis of the number of times of detecting a bank BK in a certain grid GR.

The map storage database 36 stores positional data of a bank BK as map data MI. The map storage database 36 is connected to the first communication line 35. The map storage database 36 is an external storage device (auxiliary storage device) including at least one of a ROM, a flash memory, and a hard disk drive. Every time the map data creation unit 33C detects a detection result related to a bank BK, the map storage database 36 stores the same as map data MI. In the first embodiment, the map data MI stored in the map storage database 36 is overwritten every time the map data creation unit 33C detects a bank BK. The term "overwrite" means to change a value to "1" when a bank BK is detected in a grid having a value "0", and also means to keep a value "1" even when no bank BK is detected in a grid having a value "1", but not limited to this example, it may be also possible to change the grid having the value "1" to have the value "0".

The storage unit 33D is a main storage device (internal storage device) having a higher operation speed than the map storage database 36 does.

When the determination unit 33A determines that accuracy of a GPS position of the dump truck 2 detected by the GPS receiver 31 is the predetermined accuracy or less, in other words, determines that the accuracy is low (during the scan matching navigation travel mode), the scan matching navigation position calculation unit 33B calculates a position and an azimuth direction of the dump truck 2 on the basis of: a detection result obtained by the gyro sensor 26; a detection result obtained by the speed sensor 27; and a detection result obtained by a laser sensor 24B; and map data MI read from the map storage database 36 and stored in the storage unit 33D. Meanwhile, the scan matching navigation position calculation unit 33B may also calculate a position and an azimuth direction of the dump truck 2 by calling the map data MI directly from the map storage database 36 without using the storage unit 33D.

As illustrated in FIG. 10, the scan matching navigation position calculation unit 33B calculates a position and an azimuth direction of the dump truck 2 during the scan matching navigation travel mode by integrating, using a particle filter PF, detection data obtained by the gyro sensor 26, detection data obtained by the speed sensor 27, detection data obtained by a laser sensor 24B, and map data MI stored in the map storage database 36.

Additionally, as illustrated in FIG. 4, the scan matching navigation position measurement controller 33 includes the observation point coordinate conversion unit 38 and the observation point availability determination unit 39. The observation point coordinate conversion unit 38 converts, into the XY coordinate system, a position of a detection result obtained by a laser sensor 24B and indicated by coordinates defined with a direction and a distance from the laser sensor 24B on the basis of a position and an azimuth direction of the own vehicle. The position of the detection result obtained by converting the coordinates by the observation point coordinate conversion unit 38 is defined by a height direction (Z axis direction) orthogonal to an X axis direction and a Y axis direction in addition to the X axis direction and the Y axis direction. As described above, the observation point availability determination unit 39 removes, from the detection result obtained by converting the coordinates by the observation point coordinate conversion unit 38, various kinds of noise, detection results related to a predetermined height or lower from the ground surface (ground), and the like as described above. The observation point availability determination unit 39 outputs a combined detection result to both of the map data creation unit 33C (used to create map data during the GPS travel mode) and the scan matching navigation position calculation unit 33B (used to calculate a position and an azimuth direction of the own vehicle during the scan matching navigation travel mode).

The safety controller 40 determines a relative position between a dump truck 2 and an object (bank BK, side wall, obstacle, or the like) on the basis of detection signals from a radar 24A and a laser sensor 24B. The safety controller 40 outputs existence of an obstacle to the travel controller 20 on the basis of relative positional information with respect to the object. The travel controller 20 generates a command to control at least one of the accelerator, braking device 23B, and steering device 2S on the basis of a signal acquired from the safety controller 40, and prevents the dump truck 2 from colliding with an object by controlling the dump truck 2 on the basis of the command.

<Method of Determining Travel Mode>

Figure 15:
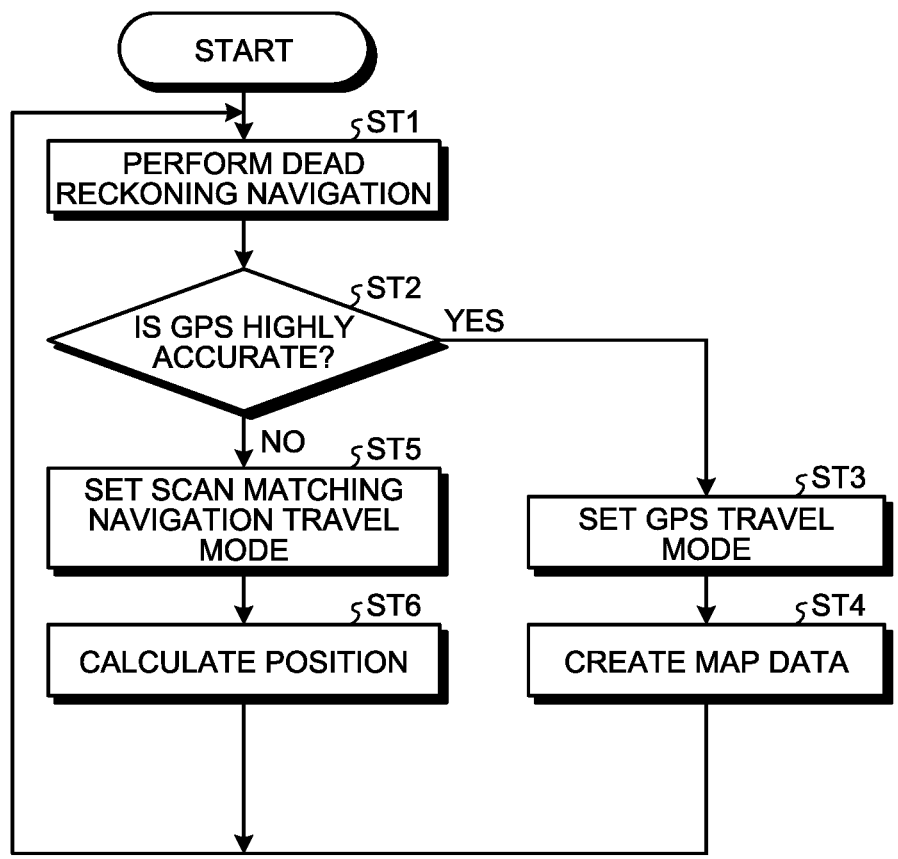
FIG. 15 is an exemplary flowchart of the control system according to the first embodiment.
Figure 16:
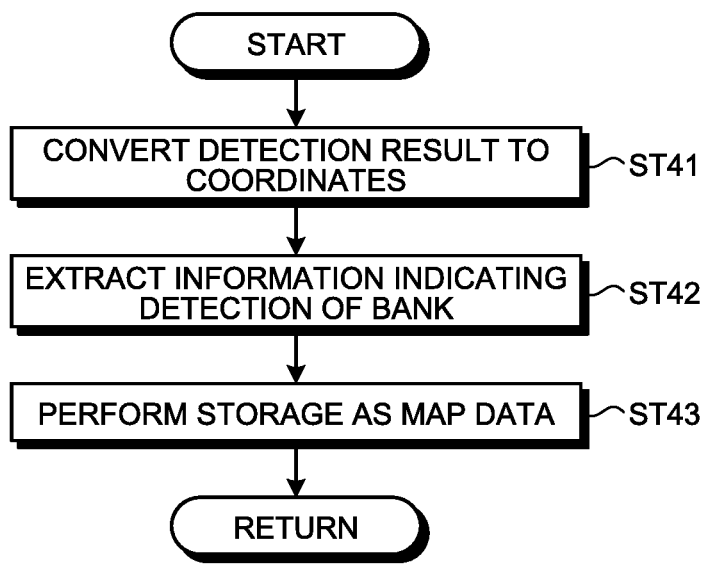
FIG. 16 is an exemplary flowchart of step ST4.
Figure 17:
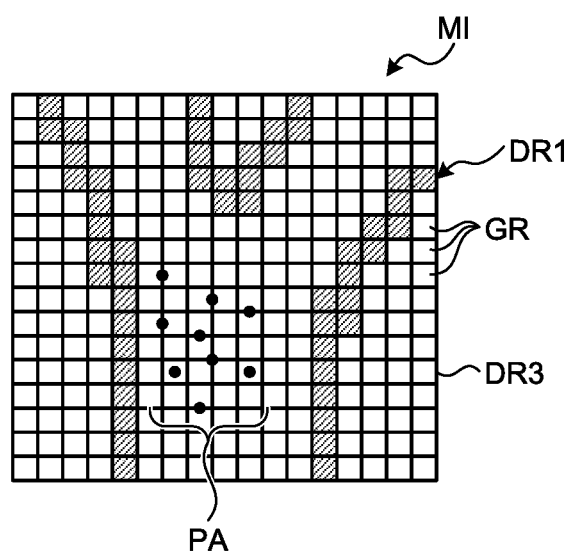
FIG. 17 is a diagram illustrating an exemplary partial region of map data read into a storage unit from the map storage database according to the first embodiment.
Figure 18:
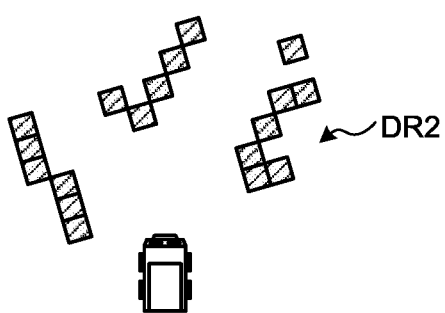
FIG. 18 is a diagram illustrating an exemplary detection result actually detected by a laser sensor of the control system according to the first embodiment.
Figure 19:
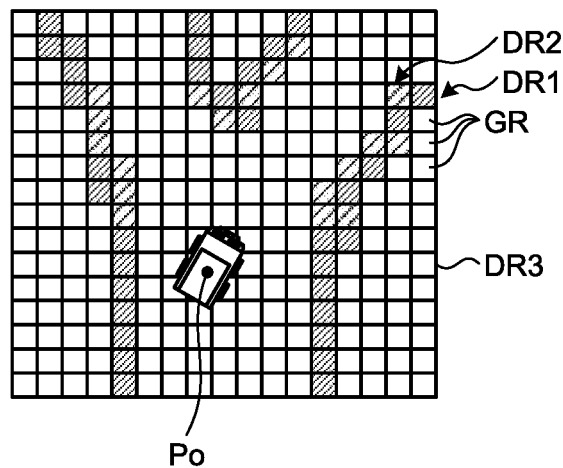
FIG. 19 is a diagram illustrating an exemplary state in which the scan matching navigation position calculation unit has calculated a position and an azimuth direction of an own vehicle on the basis of a detection result actually detected by a laser sensor of the control system according to the first embodiment.

Next, exemplary travel modes of a dump truck 2 according to the first embodiment will be described. FIG. 15 is an exemplary flowchart of the control system 30 according to the first embodiment. FIG. 16 is an exemplary flowchart of step ST4 in FIG. 15. FIG. 17 is a diagram illustrating an exemplary partial region of map data MI read into the storage unit 33D from the map storage database 36 according to the first embodiment. FIG. 18 is a diagram illustrating an exemplary detection result actually detected by a laser sensor 24B of the control system 30 according to the first embodiment. FIG. 19 is a diagram illustrating an exemplary state in which the scan matching navigation position calculation unit 33B has calculated a position and an azimuth direction of the own vehicle on the basis of a detection result actually detected by a laser sensor 24B of the control system 30 according to the first embodiment.

The flowchart in FIG. 15 will be described below. The travel controller 20 of the control system 30 executes step ST1 to cause a dump truck 2 to travel by the dead reckoning navigation in accordance with course data set for a travel route RP. Meanwhile, as illustrated in FIGS. 11 and 11, in a case where the frequency of position estimation by the dead reckoning navigation is higher than the frequency of detecting a GPS position from the GPS receiver 31, the dead reckoning navigation is performed a plurality of times in step ST1.

Next, after the GPS receiver 31 detects a GPS position, the determination unit 33A of the scan matching navigation position measurement controller 33 executes step ST2 to determine whether accuracy of the GPS position is highly accurate. More specifically, the determination unit 33A of the scan matching navigation position measurement controller 33 determines whether a solution of the GPS position detected by the GPS receiver 31 is a fix solution. When the determination unit 33A of the scan matching navigation position measurement controller 33 determines that a solution of the GPS position detected by the GPS receiver 31 is a fix solution, in other words, determines that accuracy of the GPS position of the dump truck 2 detected by the GPS receiver 31 exceeds the predetermined accuracy (step ST2: Yes), the determination result is transmitted to the travel controller 20, and the travel controller 20 shifts a current travel mode to the GPS travel mode, or continues the GPS travel mode in a case where the current travel mode is already the GPS travel mode (ST3).

Next, map data creation processing is executed by the map data creation unit 33C (step ST4), and the map data creation unit 33C creates map data MI. More specifically, the scan matching navigation position measurement controller 33 executes step ST4 to: cause the dump truck 2 to autonomously travel in accordance with course data stored in the route position storage unit 32A on the basis of the GPS position of the dump truck 2 detected by the GPS receiver 31 and a position and an azimuth direction calculated by the dead reckoning navigation; also extract a detection result related to a bank BK from a detection result obtained by a laser sensor 24B; and store the extracted detection result related to the bank BK in the map storing database 36 as map data MI of the travel route RP.

The flowchart in FIG. 16 will be described. First, on the basis of a position and an azimuth direction of the dump truck 2, the observation point coordinate conversion unit 38 converts, into a coordinate position indicated by X-Y coordinates, a position of a detection result obtained by a laser sensor 24B and indicated by coordinates defined with a direction and a distance from the laser sensor 24B (step ST41).

The observation point availability determination unit 39 extracts a detection result related to a bank BK from the detection result obtained by converting the coordinates by the observation point coordinate conversion unit 38 (step ST42). At the time of extracting a detection result related to a bank BK, the observation point availability determination unit 39 may remove various kinds of noise from the detection result obtained by converting the coordinates by the observation point coordinate conversion unit 38, in which examples of various kinds of noise may be: a detection result in which a laser beam seems to have detected dust; a detection result in which a laser beam seems to have been reflected at the ground; a detection result in which a laser beam seems to have detected a clod of earth; and the like.

The observation point availability determination unit 39 outputs, to the map data creation unit 33C, the detection result from which various kinds of noise and the like have been removed, and the map data creation unit 33C performs overwriting and stores, in the map storage database 36, a position of a bank BK that is the detection result indicating the position in the XY coordinate system as map data MI formed of the grids GR (step ST43). As described above, the term "overwrite" means to change the value to "1" (existing) in a case of receiving a detection result of detecting a new bank BK in a grid having been indicated by "0" (not existing) till then, and also means to keep the value "1" even when a detection result of detecting no existence of a new bank in the grid having been indicated by "1" till then. Additionally, while accuracy of a GPS position of the dump truck 2 detected by the GPS receiver 31 exceeds the predetermined accuracy and the GPS travel mode is continued, the control system 1 continues, as needed, extracting a detection result related to a bank BK from a detection result obtained by a laser sensor 24B and performs overwriting to store the extracted detection result related to the bank BK as the map data MI of the travel route RP by executing processing from step ST1 to step ST4.

Additionally, when the determination unit 33A of the scan matching navigation position measurement controller 33 determines that a solution of a GPS position detected by the GPS receiver 31 is not a fix solution, in other words, determines that accuracy of the GPS position of the dump truck 2 detected by the GPS receiver 31 is the predetermined accuracy or less (step ST2: No), the determination result is transmitted to the travel controller 20, and the travel controller 20 shifts the current travel mode to the scan matching navigation travel mode, or continues the scan matching navigation travel mode in a case where the current travel mode is already the scan matching navigation travel mode (ST5).

More specifically, the scan matching navigation position calculation unit 33B calculates a position and an azimuth direction of the dump truck 2 and causes the dump truck 2 to travel along a travel route RP on the basis of detection data obtained by a laser sensor 24B and the map data MI stored in the map storage database 36 and read into the storage unit 33D (step ST6). In other words, the scan matching navigation position measurement controller 33 calculates a position and an azimuth direction of the dump truck 2 by matching a detection result obtained by the laser sensor 24B with the map data MI stored in the map storage database 36. Meanwhile, even during the scan matching navigation travel mode, in a case where calculation of a position and an azimuth direction is performed by the scan matching navigation position calculation unit 33B after performing the dead reckoning navigation several times with the frequencies of calculating a position and an azimuth direction by the dead reckoning navigation and the scan matching navigation position calculation unit 33B as illustrated in FIG. 12, a position and an azimuth direction calculated by the scan matching navigation position calculation unit 33B may be adopted as current position and azimuth direction of the dump truck 2 instead of a position and an azimuth direction of the dump truck 2 having been estimated by the dead reckoning navigation till then.

As illustrated in FIGS. 17 to 19, the scan matching navigation position calculation unit 33B calculates current position and azimuth direction of a dump truck from a detection result obtained by a laser sensor 24B on the basis of the map data MI read into the storage unit 33D from the map storage database 36. In calculation performed by the scan matching navigation position calculation unit 33B, a plurality of points (particles) PA virtually arranged within a range where the dump truck 2 is expected to exist at a certain time point is used so as to calculate a position and an azimuth direction close to real values of the dump truck 2 while suppressing a calculation cost. Since self position estimation using the particles is a known method, a detailed description thereof will be omitted.

In the map data MI illustrated in FIG. 17, each square represents a grid GR. Additionally, a colored grid DR1 is a grid where a bank BK is detected, and a white-colored grid DR3 indicates a grid DR3 where no bank BK is detected. FIG. 18 illustrates detection data DR2 actually detected by a laser sensor 24B.

As illustrated in FIG. 19, a final estimation value (expected value) PO of a position and an azimuth direction in which probability of existence of the dump truck 2 is high is finally calculated by: matching the map data MI illustrated in FIG. 17 with a detection result illustrated in FIG. 18 and obtained by a laser sensor 24B; and using the method of self position estimation using the particles. In other words, the final estimation value PO is not necessarily selected from a position where any one of the particles PA has existed. As illustrated in FIG. 19, the scan matching navigation position calculation unit 33B calculates a position and an azimuth direction (final estimation value PO) of the dump truck in which a grid DR1 where a bank BK is detected in the map data MI is closest to the detection data DR2 actually detected by the laser sensor 24B. When the final estimation value PO is calculated, the scan matching navigation position calculation unit 33B calculates: estimation accuracy indicating smallness of a difference between the final estimation value PO and an absolute position (detected position by the GPS detector 31) of the dump truck 2; and reliability indicating appropriateness (likelihood) of the final estimation value PO. The appropriateness (likelihood) is a general idea to indicate a matching degree at the time of comparing already existing map data with a detection result obtained by a laser sensor 24B. Meanwhile, in FIGS. 17 to 19, a grid GR where a bank BK exists is indicated by dense parallel hatching, and a detection result of an actual bank BK is indicated by coarse parallel hatching.

Additionally, the scan matching navigation position calculation unit 33B deems the calculated position and azimuth direction of the dump truck 2 as the current position and azimuth direction of the dump truck, and the travel controller 20 again executes the dead reckoning navigation (step ST1) and controls travel (operation) of the dump truck 2 such that the dump truck 2 travels along the travel route RP. Thus, while accuracy of a GPS position of the dump truck 2 detected by the GPS receiver 31 is the predetermined accuracy or less and also the scan matching navigation travel mode is continued, the control system 30 continues calculating a position and an azimuth direction of the dump truck 2 by matching a detection result obtained by a laser sensor 24B with the map data MI of the travel route RP stored in the map storage database 36 by executing the processing in steps ST1, ST2, ST5, and ST6, and at the same time, the travel controller 20 makes the dump truck 2 travel along the travel route RP by the dead reckoning navigation on the basis of the position and the azimuth direction of the dump truck 2 calculated by the scan matching navigation position measurement controller 33.

<Method of Setting Travel Route>

As described above, in a case where a dump truck 2 travels on a travel route RP, a position and an azimuth direction of the dump truck 2 derived by the dead reckoning navigation are corrected on the basis of a GPS position detected by the GPS receiver 31 in a case of the GPS travel mode, and current position and azimuth direction of the dump truck 2 are corrected on the basis of a position and an azimuth direction calculated by the scan matching navigation position calculation unit 33B in a case of the scan matching navigation travel mode. In the following description, controlling travel of a dump truck 2 by using a GPS position that is a detection data detected by the GPS receiver 31 will be suitably referred to as GPS travel, and controlling travel of a dump truck 2 by using a position and an azimuth direction calculated by the scan matching navigation position calculation unit 33B will be suitably referred to as scan matching navigation travel.

The GPS receiver 31 can receive a signal from a GPS and detect an absolute position of a dump truck 2, but in the event of ionosphere scintillation or the like, there may be a case where a signal cannot be received from the GPS. The GPS receiver 31 is needed to receive signals from a plurality of GPSs located in the sky in order to accurately detect an absolute position of a dump truck 2 with high accuracy. However, in a time zone during which ionosphere scintillation or the like is occurring, the number of satellites from which the GPS receiver 31 can receive signals is reduced, and therefore, accuracy of absolute position detection by a GPS is lowered. In other words, since accuracy of GPS position detection is lowered in the time zone during which the ionosphere scintillation or the like is occurring, the dump truck 2 cannot perform the GPS travel and has to perform the scan matching navigation travel. To prevent deterioration of productivity in mining, it is necessary to create map data for the vicinity of a travel route where the dump truck 2 travels before occurrence of ionosphere scintillation or the like.

As illustrated in FIG. 2, in a case where the dump truck 2 travels on the hauling path HL, there is an object such as a bank BK or a side wall in the vicinity of the travel route RP, and therefore, map data of the vicinity of the travel route can be created without changing a position of the travel route during the GPS travel. Additionally, in a region for which the map data is created, the dump truck 2 can continue traveling by the scan matching navigation travel even when GPS accuracy is lowered due to occurrence of ionosphere scintillation or the like, and deterioration of productivity can be prevented.

On the other hand, in a case where the dump truck 2 travels in a workplace PA such as a loading place LPA and a discharging place DPA, a travel route to be the shortest distance from an entrance to a target position (loading position, discharging position, or the like) of the workplace PA is set.

Figure 20:
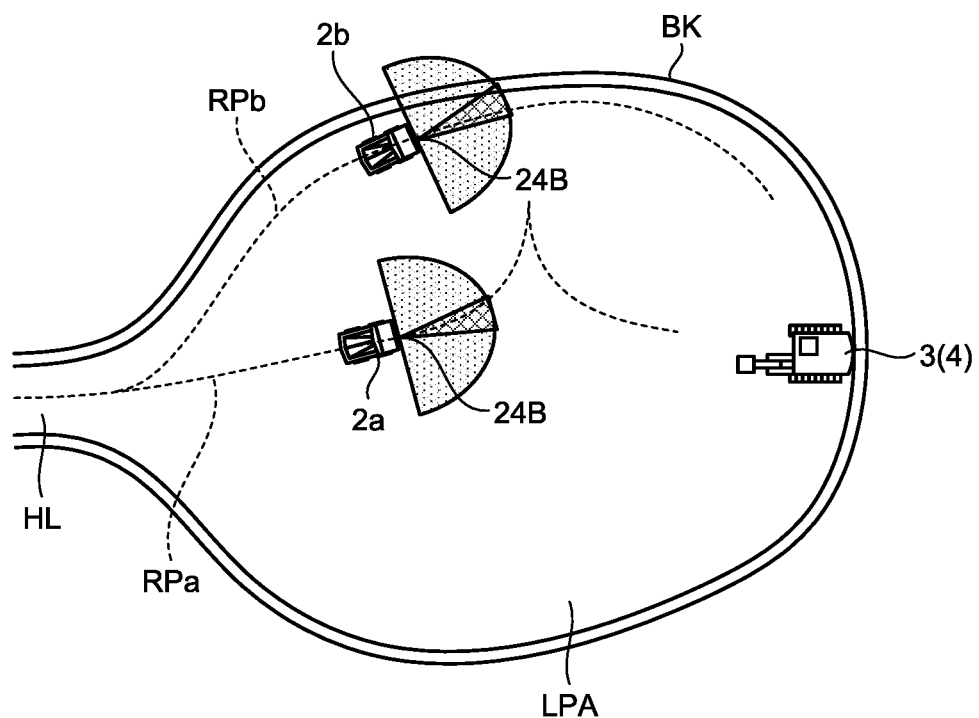
FIG. 20 is a view illustrating an exemplary travel route set in a loading place according to the first embodiment.

FIG. 20 is a view illustrating an exemplary travel route set in a loading place LPA according to the first embodiment. A dump truck 2 travels on the basis of on the travel route set in the loading place LPA by the processing device 12. In the loading place LPA, a travel route RPa located in a center of the loading place LPA and being the shortest distance from the entrance to a loading position of the loading place LPA is normally set while the dump truck 2 sets the loading position by a loading machine 3 as a target position. However, since there is no object such as a bank BK or a side wall in the vicinity of the travel route RPa, map data for the vicinity of the travel route RPa cannot be created even in a case where a dump truck 2a has traveled on the travel route RPa during the GPS travel. Therefore, in the case where the GPS accuracy is lowered due to occurrence of ionosphere scintillation or the like, the dump truck cannot travel on the travel route RPa even by using the scan matching navigation, and productivity is deteriorated.

To prevent deterioration of the productivity even in occurrence of the ionosphere scintillation or the like, it is necessary to set a travel route in the vicinity of a position where an object like a bank BK exists in order to create the map data. Accordingly, it is conceivable to set a travel route RPb in the vicinity of an outer periphery region where a bank BK or a side wall exists in the loading place LPA. During the GPS travel, that is, during the map data creation processing, a bank BK or the like (including a side wall) existing in the outer periphery of the loading place LPA can be detected by a non-contact sensor 24 by making a dump truck 2b travel on the travel route RPb located in the outer periphery region of the loading place LPA, and map data is created by the map data creation processing executed by the scan matching navigation position measurement controller 33.

In a case where the map data for the outer periphery region of the loading place LPA is created and the scan matching navigation travel comes to be able to be performed on the travel route RPb, the scan matching navigation position measurement controller 33 can perform the scan matching navigation travel even when GPS accuracy is lowered due to occurrence of ionosphere scintillation or the like. In other words, the dump truck 2b can continue traveling on the travel route RPb, and deterioration of productivity can be prevented.

Meanwhile, the travel route RPb that passes the outer periphery region of the loading place LPA makes a longer detour up to the target position than the travel route RPa that is the shortest route passing the center region of the loading place LPA. Therefore, in a case where a dump truck 2 constantly travels on the travel route RPb during the GPS travel, productivity may be deteriorated. Therefore, for example, a dump truck 2 may be arranged so as to travel on the travel route RPa during normal operation and a dump truck 2 may be arranged so as to travel on the travel route RPb a little before an expected time when ionosphere scintillation or the like starts to occur. Since the dump truck 2 is thus arranged to travel on the travel route RPb, map data of the vicinity of the travel route RPb is created.

Then, after it is determined that the map data is created to a level in which a dump truck 2 can travel on the travel route RPb by the scan matching navigation, the dump truck 2 may be arranged so as to travel again on the travel route RPa. For example, when a dump truck 2 travels on the travel route RPb predetermined number of times, the dump truck 2 may be arranged so as to travel again on the travel route RPa.

Next, a specific method in which the dump truck 2b in FIG. 20 travels on the travel route RPb will be described. To accurately calculate a position of a dump truck 2 by the scan matching navigation, it is necessary to arrange many colored grids DR1 in the vicinity of the travel route RPb. For this, it is necessary to create map data by making a dump truck 2 travel more on the travel route RPb in the GPS travel mode (map data creation processing) to cause a non-contact sensor to detect an object (bank BK or side wall) located in the vicinity of the travel route RPb.

The dump truck 2 is made to travel on the same travel route RP a plurality of times, and the larger number of the colored grids DR1 is arranged in the vicinity of the travel route RP, the higher perfection of map data for the travel route RP can be achieved. In a case where the dump truck 2 travels, by the scan matching navigation travel mode, on the travel route RP having high perfection of map data, an absolute position of the dump truck 2 can be calculated with high accuracy by the scan matching navigation position calculation unit 33B. Meanwhile, high perfection of map data may also be achieved by making a plurality of dump trucks 2 travel on the same travel route RP and superimposing results of map data created by the respective dump trucks 2.

The perfection of map data can be determined in an arbitrary region in the vicinity of the travel route RP on the basis of a ratio between a colored grid DR1 (first detection data) and a non-colored grid DR3 (second detection data). For example, in a case where a ratio of the colored grids DR1 is a predetermined value or more in a predetermined region in the vicinity of the travel route RP (similar to a case where a ratio of the non-colored grids DR3 is less than a predetermined value), perfection of map data may be identified as high, and in a case where the ratio of the colored grids DR1 is less than the predetermined value, perfection of map data may be identified as low.

Meanwhile, to identify perfection of map data, determination may be made on the basis of the number of times a dump truck 2 has traveled on a certain travel route. For example, in a case where the dump truck 2 travels on the certain travel route predetermined number of times or more, perfection of map data of the travel route may be determined as high, and perfection of map data may be determined as low for a travel route where the dump truck 2 travels less than the predetermined number of times.

Additionally, a following method may also be used to identify perfection of map data. At the time of traveling on a certain travel route by the GPS travel, position calculation is executed by the scan matching navigation in the scan matching navigation position calculation unit 33B while traveling is performed measuring a position of a dump truck 2 by using a GPS. Then, on the basis of estimation accuracy or appropriateness (likelihood) of a result obtained from the position calculation, perfection of map data at a position on the travel route subjected to the position calculation may be identified.

In that case, for example, in a case where estimation accuracy and likelihood of the result obtained from position calculation by the scan matching navigation is high, perfection of map data in the position can be determined as high, and in a case where estimation accuracy or likelihood of the result obtained from the position calculation by the scan matching navigation is low, perfection of map data in the position can be determined as low.

In this position calculation, perfection of map data at a certain position (for example, one point like a final estimated value Po in FIG. 19) is merely determined, and therefore, in a case where positions each having low perfection of map data continuously exist in a travel route, an area or a travel route having low perfection of the map data may be identified by combining these positions.

Additionally, for example, in a case of identifying a position, an area, or a travel route having low perfection of map data, such a position, area, or travel route is output to the display device 16, and a supervisor may be able to confirm the position, area, or travel route having the low perfection of the map data by displaying the position, area, or travel route on the display device 16.

As a criterion to differentiate an area having a high perfection of map data from an area having a low perfection thereof, it is possible to adopt a determination criterion in which, for example, determination is made on the basis of whether colored grids DR1 are formed to an extent that predetermined estimation accuracy and likelihood are ensured in position calculation by the scan matching navigation. In other words, whether a dump truck 2 can travel on a travel route RP with the predetermined estimation accuracy and likelihood by the scan matching navigation can be adopted as the determination criterion.

Figure 21:
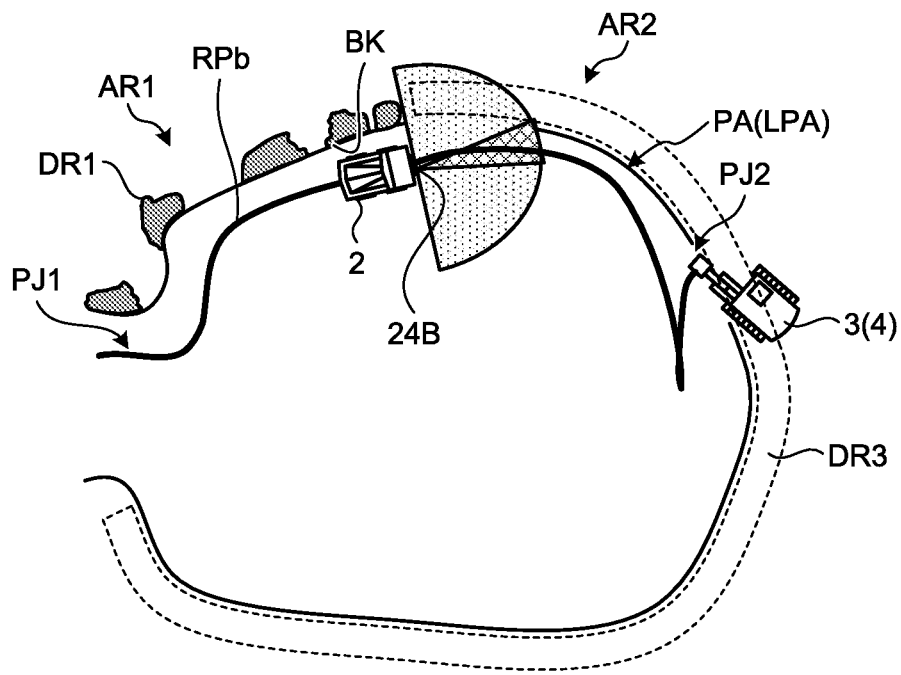
FIG. 21 is a diagram illustrating course data set in a second area according to the first embodiment.

FIG. 21 illustrates a state in which a dump truck 2 creates map data in a bank BK by performing the GPS travel in the vicinity of the bank BK in a loading place LPA. A travel route RPb in the workplace PA is set such that the bank BK of the workplace PA is located in a detection area of a laser sensor 24B. The processing device 12 having the travel route generation unit 19 holds positional data of the bank BK in the workplace PA from, for example, mine map information obtained from a preliminarily course survey in a mine.

As illustrated in FIG. 21, a colored grid DR1 is formed in the vicinity of the travel route RPb after the dump truck 2 has traveled. Then, an area having a ratio of the colored grids DR1 being a predetermined value or more is identified as a first area AR1 that is the area having high perfection of map data, and an area having low perfection of map data is identified as a second area AR2. A first area AR1 and a second area AR2 are identified by the identifying unit 14 of the management device 10, for example. In a case of the loading place LPA in FIG. 21, the ratio of the colored grids DR1 is less than the predetermined value in a region determined as the second area AR2, and the ratio of the colored grids DR1 is larger than the predetermined value in a region determined as the first area AR1. The first area AR1 and second area AR2 are defined in the global coordinate system.

A first area AR1 includes an area where the ratio of the colored grids DR1 is a predetermined ratio or more because the dump truck 2 has traveled in the past for the map data creation processing. On the other hand, a second area AR2 includes an area where the dump truck 2 has not traveled for the map data creation processing in the past. The second area AR2 also includes an area where a ratio of the colored grids DR1 does not reach the predetermined ratio although the dump truck 2 has traveled in the past for the map data creation processing.

Here, a region in the vicinity of the travel route RPb can be arbitrarily determined. For example, a region in the vicinity of the travel route RPb may be sectioned into certain number of sections, and a ratio of the colored grids DR1 may be determined per section. Additionally, a lateral width of a region in the vicinity of the travel route RPb with respect to the advancing direction can be suitably set.

Additionally, an administrator may manually set a region in an outer periphery of the workplace PA as a first area AR1 or a second area AR2 by using the input device 17 (designation unit) of the management device 10. For example, referring to the map data MI displayed on the display device 16, it is possible to designate a first area AR1 or a second area AR2 by using the input device 17 like a mouse. Then, area information designated by the input device 17 (designation unit) is output to the identifying unit 14 of the management device 10 in the same manner to identify the first area AR1 or the second area AR2.

Furthermore, a target to be designated by the input device 17 (designation unit) is not limited to a region in the vicinity of the travel route, and for example, designation may be made on a travel route itself. In this case, a first travel route having high perfection of map data and a second travel route having low perfection of map data are designated by the input device 17.

Additionally, information related to a first area AR1 or a first travel route, or information related to a second area AR2 or a second travel route designated by the input device 17 (designation unit) is output to the travel route generation unit 19, and the travel route generation unit 19 may generate a travel route on the basis of the information from the input device 17.

Additionally, which one of the first travel route RPa and the second travel route RPb where the dump truck 2 is arranged to travel may be designated by the input device (designation unit). In this case, the information from the input device 17 is output to the travel route generation unit 19, and the travel route generation unit 19 generates a travel route on the basis of the information from the input device 17.

Meanwhile, a target to be identified by the identifying unit 14 is not limited to the example of identifying perfection of map data in a region in the vicinity of a travel route RPb, and a level of perfection of map data may be identified per travel route or per workplace.

When GPS accuracy is lowered and the travel mode is shifted from the GPS travel mode to the scan matching navigation travel mode due to occurrence of ionosphere scintillation or the like, in a case where a second area AR2 exists in an outer periphery of a workplace, a dump truck 2 may be stopped and productivity may be deteriorated in the worst case when the dump truck 2 attempts to pass the second area AR2 by the scan matching navigation travel.

Therefore, in a situation where ionosphere scintillation or the like does not occur and the GPS accuracy is high enough to perform the map data creation processing by the GPS travel, it is desirable that: traveling is preferentially performed on the travel route RPb; a ratio of the colored grids DR1 is increased by detecting an object like a bank BK existing in a second area AR2; and the area is switched to the first area AR1.

Therefore, the travel route generation unit 19 of the processing device 12 is made to output data indicating a first area AR1 and data indicating a second area AR2 identified by the identifying unit 14, and in a case where there is a second area AR2, the travel route generation unit 19 preferentially sets, as a travel route where a dump truck 2 actually travels, the travel route RPb having the second area AR2 in the vicinity thereof.

The travel controller 20 causes the dump truck 2 to travel along the set travel route RPb in the GPS travel mode.

The map data creation unit 33C creates map data of the second area AR2 on the basis of detection data obtained by the GPS detector 31 and detection data obtained by a laser sensor 24C provided in the dump truck 2 that travels in the second areas AR2. The created map data of the second area AR2 is stored in the map storage database 36.

A condition in which an entire region of the second area AR2 at a workplace is switched to the first area AR1 or a dump truck 2 travels on the second travel route RPb the predetermined number of times can be set as a condition to switch, from the second travel route RPb to the first travel route RPa, a travel route where the dump truck 2 travels in the GPS travel mode while having high perfection of map data in a workplace.

Figure 22:
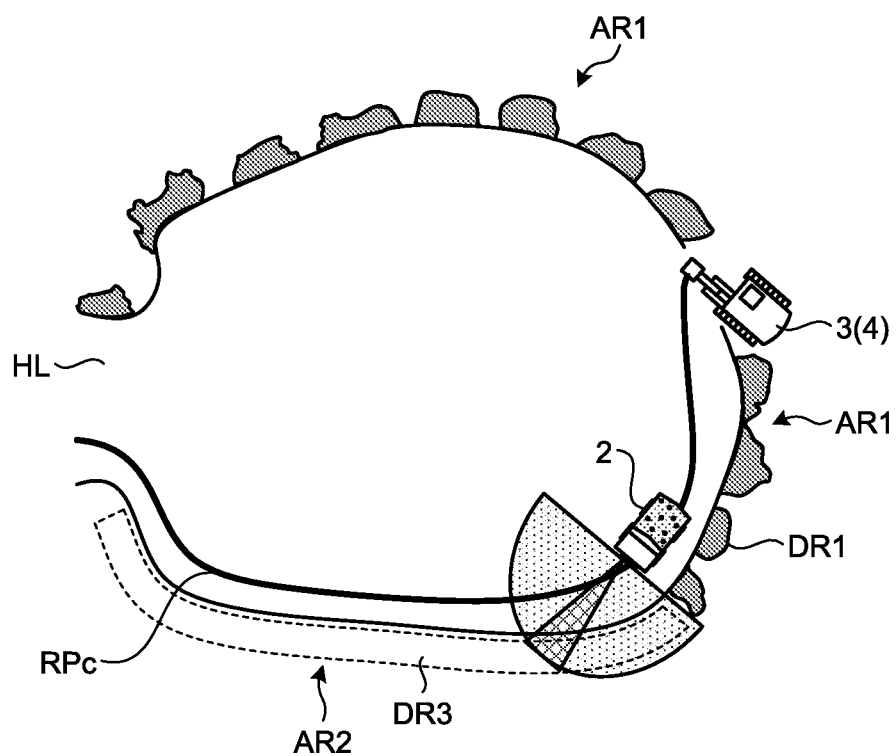
FIG. 22 is a diagram illustrating course data set in the second area according to the first embodiment.

Meanwhile, a dump truck 2 may have to travel on, for example, a travel route RPc different from the travel route RPb up to the loading position as illustrated in FIG. 22 in order that the dump truck 2 may reach a loading position in a loading place by the scan matching navigation travel and return to a hauling path HL from the loading position by the scan matching navigation travel after loading ores or the like in a state that ionosphere scintillation or the like is occurring. In this case, regions in the vicinities of the two travel routes including the travel route RPb from an entrance to a target position (loading position) of the workplace and the travel route RPc from the target position to an exit of the workplace are needed to be switched to the first area AR1.

Therefore, a condition to be satisfied to switch the travel route from the second travel route RPb to the first travel route RPa may be a condition in which all of the regions in the vicinities of not only the travel route RPb from the entrance to the target position of the workplace but also the travel route RPc from the target position to the exit of the workplace are switched to the first area AR1.

Figure 23:
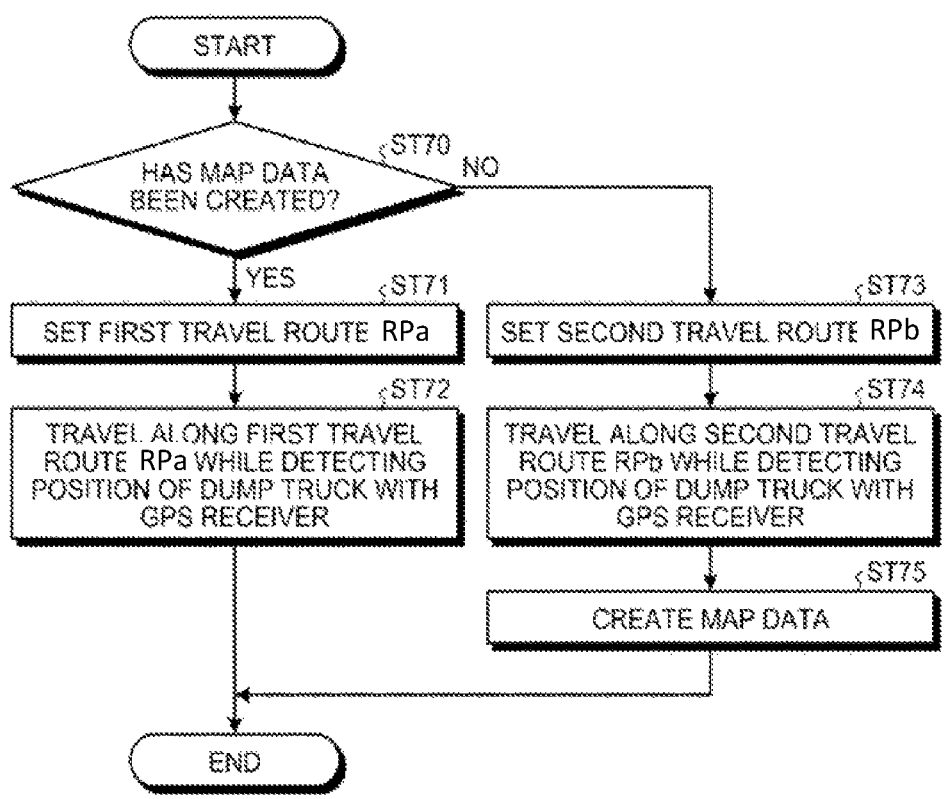
FIG. 23 is a flowchart illustrating an exemplary travel route setting method according to the first embodiment.
Figure 24:
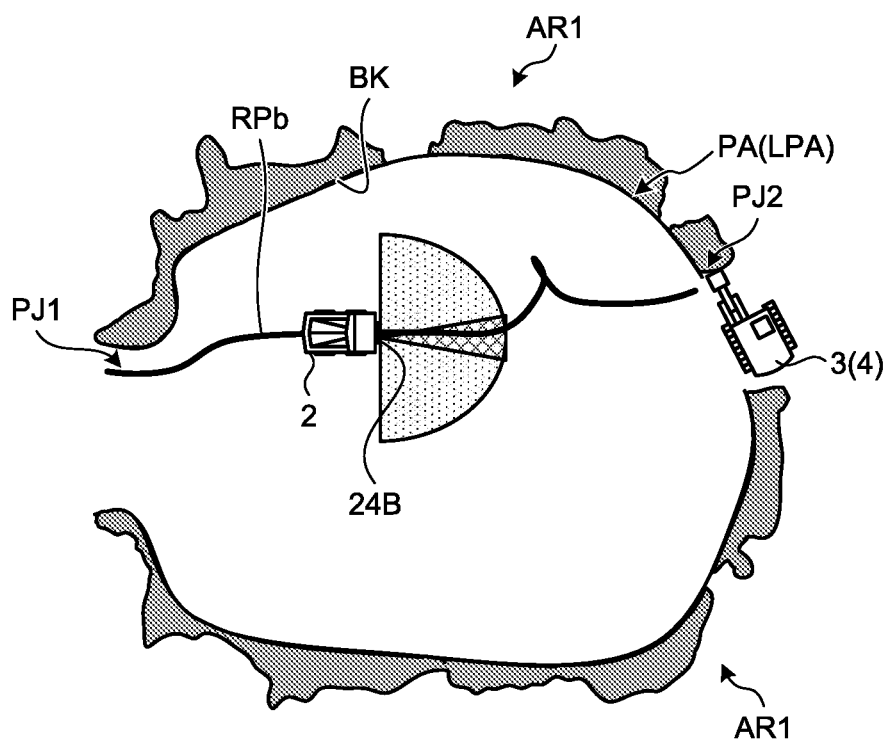
FIG. 24 is a schematic diagram illustrating an exemplary travel route set in a workplace according to the first embodiment.

In the following, a method of setting a travel route in a workplace PA according to the first embodiment will be described. FIG. 23 is a flowchart illustrating an exemplary travel route setting method according to the first embodiment. FIGS. 21 and 24 are schematic diagrams illustrating exemplary travel routes set in the workplace PA. In FIGS. 21 and 24, the workplace PA is a loading place LPA.

The identifying unit 14 determines whether creation of map data for the workplace PA has been completed, that is, whether perfection of the map data is high (step ST70).

For example, the identifying unit 14 can make a determination on the basis of, for example, perfection of map data in a region in the vicinity of a travel route, that is, a region provided with a bank BK in an outer periphery of a workplace PA. The method of determining perfection of the map data is as described above. For example, determination may be made on the basis of the number of times the dump truck 2 has traveled on the second travel route RPb.

As another determining method, determination may be made on the basis of estimation accuracy or appropriateness (likelihood) of a result obtained from position calculation in a case of performing the position calculation by the scan matching navigation as described above.

In a case of determining in step ST70 that creation of the map data has not been completed yet (step ST73: No), the map data creation processing is continued.

In a case of determining in step ST70 that creation of the map data has been completed (step ST70: Yes), the processing device 12 sets the first travel route RPa in the workplace PA such that a bank BK is located in a detection area of a laser sensor 24B on the basis of positional data of the bank BK inside the mine map information, and the first travel route RPa is to be a shortest route from an entrance position PJ1 to the target position PJ2 of the workplace PA (step ST71).

The travel controller 20 controls travel of a dump truck 2 so as to travel along the first travel route RPa. The dump truck 2 travels along the first travel route RPa while detecting the position of the dump truck 2 with the GPS detector 31 (step ST72).

In the case of determining in step ST70 that creation of the map data has not been completed yet (step ST70: No), the processing device 12 sets a second travel route RPb in the workplace PA on the basis of the positional information of the bank BK inside the mine map information such that the bank BK is located in the detection area of the laser sensor 24B (step ST73).

The travel controller 20 controls travel of the dump truck 2 so as to travel along the second travel route RPb. The dump truck 2 travels along the second travel route RPb while detecting the position of the dump truck 2 with the GPS detector 31 and also detecting the bank BK with the laser sensor 24B (step ST74).

As illustrated in FIG. 21, the second travel route RPb is set such that the dump truck 2 travels from the first position PJ1 (entrance) to the second position PJ2 (loading position) of the workplace PA in a state that the bank BK is located in the detection area of the laser sensor 24B that detects a front region of the dump truck 2. The map data creating processing is executed in parallel to normal hauling work by the dump truck 2. Meanwhile, the normal hauling work by the dump truck 2 includes at least one of loading work and discharging work.

The map data creation unit 33C creates map data that is a detection result of the bank BK on the basis of detection data obtained by the GPS detector 31 and detection data obtained by the laser sensor 24B provided in the dump truck 2 traveling along the second travel route RPb (step ST75).

FIG. 24 is the schematic diagram illustrating an exemplary workplace PA where a first travel route RPa is set. The first travel route RPa is set such that a dump truck 2 travels from a first position PJ1 to the second position PJ2 of the workplace PA. As illustrated in FIGS. 21 and 24, in a case of making the dump truck 2 travel from the first position PJ1 to the second position PJ2, a travel distance of the dump truck 2 at the time of traveling along the first travel route RPa is shorter than a travel distance of the dump truck 2 at the time of traveling along the second travel route RPb. In other words, after completion of creating the map data for the workplace PA, the processing device 12 suppresses deterioration of productivity by setting the first travel route RPa having the travel distance of the dump truck 2 from the first position PJ1 to the second position PJ2 shorter than the second travel route RPb.

In a case where the dump truck 2 travels along the first travel route RPa, the dump truck 2 is likely to travel at a position away from a bank BK. In other words, in the case where the dump truck 2 travels along the first travel route RPa, a bank BK may not be located in the detection area of the laser sensor 24B.

In the case of making the dump truck 2 travel along the first travel route RPa, the travel controller 20 makes the dump truck 2 travel by the GPS travel. In other words, the travel controller 20 causes the dump truck 2 to travel along the first travel route RPa while detecting the position of the dump truck 2 with the GPS receiver 31.

In a state that creation of the map data for the workplace PA has been completed, the travel controller 20 can make the dump truck 2 perform scan matching navigation travel even in a case where the GPS travel cannot be continued due to occurrence of ionosphere scintillation or the like. In this case, a bank BK is located in the detection area of the laser sensor 24B by making the dump truck 2 travel along the second travel route RPb.

Detection data obtained by the laser sensor 24B is output to the scan matching navigation position calculation unit 33B. In the scan matching navigation travel, the scan matching navigation position calculation unit 33B calculates a position of the dump truck 2 by matching map data stored in the map storage database 36 with the detection data obtained by the laser sensor 24B. The travel controller 20 causes the dump truck 2 to travel so as to travel along the second travel route RPb in the workplace PA on the basis of the position of the dump truck 2 calculated by the scan matching navigation position calculation unit 33B and the second travel route RPb.

Meanwhile, the description has been provided assuming that a target to be detected by the laser sensor 24B is a bank BK in the above-described flowchart, but not limited thereto, a side wall provided in an outer periphery of a workplace PA may also be set as a detection target, for example. Additionally, while the description has been provided by using the embodiment in the loading place LPA, but not limited thereto, the present invention may be applied to, for example, a discharging place DPA, a machine parking place, or a wide region other than these.

<Functions and Effects>

As described above, according to the first embodiment, in the case where map data of a workplace PA in a mine is not created, the second travel route RPb to define a travel route RP in the workplace PA is set such that a bank BK of the workplace PA is located in the detection area of the laser sensor 24B of the dump truck 2. Consequently, the map data creation processing can be executed by making the dump truck 2 travel along the second travel route RPb. Since the map data of the workplace PA is created, the dump truck 2 can travel in the workplace PA by the scan matching navigation travel even in occurrence of ionosphere scintillation. Consequently, deterioration of productivity by the dump truck 2 in the mine can be suppressed.

Additionally, according to the first embodiment, the travel route is switched from the second travel route RPb to the first travel route RPa after creation of the map data is completed. Since the travel route is switched to the first travel route RPa, a travel distance of the dump truck 2 can be shortened, and therefore, work efficiency can be improved.

<Other Embodiments>

Meanwhile, in a case where a plurality of dump trucks 2 travels in a mine, a storage device 13 of a management device 10 may create integrated map data by integrating first map data created on the basis of detection data obtained by a laser sensor 24B and detection data obtained by a GPS detector 31 provided in a first dump truck 2 with second map data created on the basis of detection data obtained by a laser sensor 24B and detection data of a GPS detector 31 provided in a second dump truck 2. The first map data created by the first dump truck 2 and the second map data created by the second dump truck 2 are transmitted via a communication system 9 to the management device 10 functioning as an integration unit. Consequently, the storage device 13 can create the integrated map data by integrating the first map data with the second map data.

For example, as for a predetermined area in an outer periphery of a workplace PA, the predetermined area may be a first area AR1 in the first map data, and the predetermined area may be a second area AR2 in the second map data. Since the first map data and the second map data are integrated and the integrated map data is distributed to each of the first dump truck 2 and the second dump truck 2, each of the first dump truck 2 and the second dump truck 2 can travel while holding the map data in which the predetermined area is the first area AR1. In this case, as for the second dump truck 2, the number of options of a route where the scan matching navigation travel can be performed is increased by switching use of the second map data to use of the integrated map data.

Note that the integration unit to integrate the first map data with the second map data may be provided in a computer of at least one certain dump truck 2 out of the plurality of dump trucks 2. In this case, map data from other dump trucks 2 is transmitted to the certain dump truck 2. After integrating pieces of the map data transmitted from other plurality of dump trucks 2 to create integrated map data, and the certain dump truck 2 distributes the same to other dump trucks 2.

Meanwhile, in the above-described embodiment, a travel route generation unit 19, the identifying unit 14, and a designation unit 17 are provided in the management device 10 of a control facility 7 constructed at a position different from a dump truck 2. The travel route generation unit 19, identifying unit 14, and designation unit 17 may also be provided in a computer of a dump truck 2. For example, a travel route determination device 32 may also function as the travel route generation unit 19, identifying unit 14, and designation unit 17.

In the above embodiment, a travel route of a dump truck 2 in a loading place LPA has been described, but not limited to the loading place, and a travel route may be determined by a similar method, for example, in a discharging place DPA.

Meanwhile, in the respective embodiments described above, detection data obtained by a laser sensor 24B out of non-contact sensors 24 is used during scan matching navigation travel and during GPS travel (map data creation processing). Detection data obtained by a radar 24A out of the non-contact sensors 24 may also be used at least one of during the scan matching navigation travel and during the GPS travel. Note that each non-contact sensor 24 may be any distance measuring sensor capable of measuring a relative position with respect to an object in the vicinity of a dump truck 2. For example, a camera that acquires an optical image of an object in the vicinity of the dump truck 2 may also be used as a non-contact sensor 24.

In the above embodiment, the identifying unit 14 identifies a region in a periphery of a workplace as either one of a first area AR1 having high perfection of map data and a second area AR2 having low perfection of map data, and in a case where the second area AR2 exists in the region in the outer periphery of the workplace, the travel route generation unit 19 generates a travel route such that a dump truck is made to preferentially pass a second travel route RPb located on the outer periphery side of the workplace, but not limited thereto, for example, which one of a first travel route RPa and the second travel route RPb where the dump truck 2 should travel may be designated by an input device 17 (designation unit).

Additionally, in the above-described embodiments, a method described in the flowchart of FIG. 15 is used as the method of calculating a position and an azimuth direction of a dump truck 2 by the scan matching navigation position calculation unit 33B, but not limited thereto, any method may be applicable as far as that is a method in which current position and azimuth direction of a dump truck 2 are calculated by comparing a detection result obtained by a laser sensor 24B with stored map data.

Additionally, in the above embodiment, whether a solution of a GPS position detected by the GPS receiver 31 is a fix solution is determined at the time of determining whether accuracy of a GPS position is highly accurate, but not limited thereto, for example, it may be possible to determine that the GPS position is highly accurate when a predetermined condition is satisfied even though a solution is a float solution.

Furthermore, in the above-described embodiments, a position and an azimuth direction are estimated by the dead reckoning navigation in both of the GPS travel mode and the scan matching navigation travel mode, but the dead reckoning navigation is not necessarily performed as far as a cycle of detecting a detection signal from the GPS receiver or a detection signal from the scan matching navigation position calculation unit is substantially similar to that of the dead reckoning navigation.

Additionally, in the above-described embodiments, a map data creation unit 33C is provided inside a dump truck 2, but not limited thereto, for example, the map data creation unit 33C may be provided in a computer 11 inside the management device 10 or on a server provided in a different place, and a detection result obtained by a laser sensor 24B and necessary information such as current position and azimuth direction of the dump truck 2 may be transmitted to the map data creation unit 33C.

Furthermore, a map storage database (map data) is provided inside a dump truck 2, but not limited thereto, for example, the map data may be saved in the computer 11 inside the management device 10, on a server provided in a different place, in a different mining machine 4, or the like, and the map data may be received from the outside of the dump truck 2 before calculating a position and an azimuth direction of the dump truck 2 by the scan matching navigation.

In the above embodiments, the description has been provided by exemplifying a mining machine used in a mine, but not limited thereto, and application to a work machine used in an underground mine and a work machine used in a work site on the ground may also be possible. The work machine includes a mining machine. Furthermore, as a "control system for a work machine", the description has been provided by exemplifying a control system for a dump truck in a mine on the ground in the above-described embodiments, but not limited thereto, also included is a control system for a work machine provided with a "position detecting device", a "non-contact sensor", and a "position calculation unit", namely, a different mining machine in a mine on the ground, a work machine in an underground mine, or a work machine used in a work site on the ground (such as an excavator, a bulldozer, and a wheel loader).

Additionally, in the above embodiment, a position of a mining machine is detected by using a GPS detector, but not limited thereto, a position of a mining machine can also be detected on the basis of a known "position detecting device". Particularly, since a GNSS cannot be detected in an underground mine, it may be possible to use self position estimation for a work machine or the like using known position detecting devices such as an indoor messaging system (IMES), a pseudo satellite (pseudolite), a radio frequency identifier (RFID), a beacon, a surveying instrument, a radio LAN, an ultra wide band (UWB), a simultaneous localization and mapping (SLAM), and a landmark (mark provided in the vicinity of a travel route). These position detecting devices may be used in a mining machine on the ground in a mine or a work machine used in a work site on the ground.

Meanwhile, an "object in the vicinity of a travel route" may include not only a bank, a side wall, and the like but also a structure artificially structured provided in the vicinity of a hauling path or a travel route in a workplace of a mine. Furthermore, included are obstacles such as a wall surface existing at a travel route in an underground mine, an embankment, a building, a tree, and the like existing in a periphery of a travel route of a work machine at a work site on the ground.

Additionally, in the above-described embodiment, a loading place and a discharging place are exemplified as exemplary workplaces, but not limited thereto, also included are a parking area, an area to perform maintenance, an area to perform refueling, and the like, for example.

The constituent elements in each of the embodiments described above include those readily conceivable by a man skilled in the art, those substantially identical, and those included in a so-called equivalent scope. Furthermore, the above-described constituent elements in each of the above-described embodiment can be suitably combined. Additionally, some of the constituent elements may not be used.

REFERENCE SIGNS LIST

1 Management system
2 Dump truck (mining machine)

2E Internal combustion engine
2G Generator
2S Steering device
3 Different mining machine
4 Mining machine
5 Positioning satellite
6 Repeater
7 Control facility
9 Communication system
10 Management device
11 Computer
12 Processing device (course data creation unit)
13 Storage device
13B Database
15 Input/output unit
16 Display device
17 Input device
18 Radio communication device
18A Antenna
19 GPS base station
19A Antenna
19B Transmitter/receiver
19C Antenna
20 Travel controller (travel control unit)
21 Vehicle body
22 Vessel
23 Wheel
23B Braking device
23F Front wheel
23M Electric motor
23R Rear wheel
24 Non-contact sensor
24A Radar
24B Laser sensor
26 Gyro sensor
27 Speed sensor
29 Interface
30 Navigation system
31 GPS receiver (position detecting device)
31A Antenna
31B Antenna
32 Travel route creation device
32A Route position storage unit
33 Position measurement controller
33A Determination unit
33B Scan matching navigation position calculation unit (position calculation unit)
33C Map data creation unit
33D Storage unit (second storage unit)
33E Map determination unit
34 Radio communication device
34A Antenna
35 First signal line
36 Map storage database
37A Second communication line
37B Third communication line
38 Observation point coordinate conversion unit
39 Observation point availability determination unit
40 Safety controller
41 Gateway controller
321 Input/output unit
322 Arithmetic processing device
323 Main storage device (second storage unit)
324 External storage device
325 External storage device (first storage unit)
331 Input/output unit
332 Arithmetic processing device
333 Main storage device (second storage unit)
334 External storage device
335 External storage device (first storage unit)
BK Bank
CR Crusher
DPA Discharging place
GR Grid
HL Hauling path
IAH Radiation area
IAV Irradiation area
IS Intersection
KF Kalman filter
LPA Loading place
MI Map data
MIf Pinpoint map data
MIm Management map data
MIp Divided map data piece
RP Travel route

The invention claimed is:

1. A work machine management system comprising:
a position detecting device configured to detect a position of a work machine traveling in a workplace, based on positioning signals received from GPS satellites;
a non-contact sensor configured to detect, in a non-contact manner, an object existing in the workplace;
at least one processor;
at least one memory including computer program code, wherein the computer program code, when executed by operation of the at least one processor, causes the work machine management system to:
determine with a determination unit whether the position detecting device is capable of accurately determining a position;
accumulate information for new map data on existence and a position of the object existing in the workplace on the basis of detection data obtained by the position detecting device and detection data obtained by the non-contact sensor, when the position detecting device is determined to be accurate;
wherein new map data in each grid in an area of the map data is a grid color based on a number of times that the object has been detected in the grid by the work machine as it has traveled on a travel route in the workplace;
identify with an identifying unit perfection of map data in accordance with a ratio between a colored grid and a non-colored grid in an area of the map data; and
generate with a travel route generation unit a travel route where the work machine travels on the basis of the perfection of the new map data identified by the identifying unit,
wherein the map data allows a position of the work machine to be calculated by matching the map data with the detection data obtained by the non-contact sensor, and
in a case where the perfection of the map data is low, a travel route is generated that is located in an outer periphery in vicinity of the workplace included in a detection area by the non-contact sensor.

2. The work machine management system according to claim 1, wherein
the travel route generation unit includes a first travel route that passes is located in at least a center region from a first position to a second position in the workplace, and a second travel route that is located in an outer periphery region that extends from the first position to the second position in the workplace, and in a case where the identifying unit determines that perfection of map data in the second travel route is low, the travel route generation unit generates a travel route so as to make the work machine preferentially pass the second travel route.

3. The work machine management system according to claim 2, wherein
the second travel route having low perfection of-the map data includes at least one of: a travel route in which the non-contact sensor cannot detect the object; a travel route in which the map data cannot be created; a travel route in which a ratio of a region where the object is detected in a vicinity of the second travel route is a predetermined value or less; and a travel route in which the work machine has traveled on the second travel route predetermined number of times or less.

4. The work machine management system according to claim 2, wherein
when the identifying unit determines that perfection of the map data in the workplace is high, the travel route generation unit sets, to the first travel route, a travel route along which the work machine travels in the workplace.

5. The work machine management system according to claim 1, comprising
the at least one memory including computer program code, wherein the computer program code, when executed by operation of the at least one processor, causes the work machine management system to:
calculate with a scan matching navigation position calculation unit a position of the work machine by matching a detection result obtained by the non-contact sensor with the map data,
wherein the scan matching navigation position calculation unit calculates estimation perfection or likelihood of a calculation result,
the map data identifying unit identifies perfection of map data on the basis of a calculation result of the estimation perfection or the likelihood, and
the travel route generation unit generates the travel route where the work machine travels on the basis of the perfection of the map data identified by the identifying unit.

6. The work machine management system according to claim 1, comprising
the at least one memory including computer program code, wherein the computer program code, when executed by operation of the at least one processor, causes the work machine management system to:
designate with a designation unit perfection of the map data per area or per travel route,
wherein the identifying unit identifies perfection of the map data on the basis of information on perfection of map data obtained from the designation unit.

7. The work machine management system according to claim 1, comprising
a first work machine and a second work machine,
the at least one memory including computer program code, wherein the computer program code, when executed by operation of the at least one processor, causes the work machine management system to:
create with an integration unit integrated map data by integrating first map data with second map data, in which the first map data is created on the basis of detection data obtained by the position detecting device and detection data obtained by the non-contact sensor provided in the first work machine, and the second map data is created on the basis of detection data obtained by the position detecting device and detection data obtained by the non-contact sensor provided in the second work machine.

8. A work machine comprising the work machine management system according to claim 1.

9. A work machine management system comprising:
a position detecting device configured to detect a position of a work machine traveling in a workplace, based on positioning signals received from GPS satellites;
a non-contact sensor configured to detect, in a non-contact manner, an object existing in the workplace;
at least one processor;
at least one memory including computer program code, wherein the computer program code, when executed by operation of the at least one processor, causes the work machine management system to:
determine with a determination unit whether the position detecting device is capable of accurately determining a position;
accumulate information for new map data on existence and a position of the object existing in the workplace on the basis of detection data obtained by the position detecting device and detection data obtained by the non-contact sensor, when the position detecting device is determined to be accurate;
wherein new map data in each grid in an area of the map data is a grid color based on a number of times that the object has been detected in the grid by the work machine as it has traveled on a travel route in the workplace;
and
designate with a designation unit perfection of map data in accordance with a ratio between a colored grid and a non-colored grid in an area of the map data in a travel route,
generate with a travel route generation unit a travel route so as to make the work machine preferentially pass the travel route on the basis of the perfection of information from the designation unit,
wherein the map data allows a position of the work machine to be calculated by matching the map data with the detection data obtained by the non-contact sensor, and
in a case where the perfection of the map data is low, a travel route is generated that passes is located in an outer periphery in vicinity of the workplace included in a detection area by the non-contact sensor.

10. A work machine management system, comprising:
a position detecting device configured to detect a position of a work machine traveling in a workplace, based on positioning signals received from GPS satellites;
a non-contact sensor configured to detect, in a non-contact manner, an object existing in the workplace;
at least one processor;
at least one memory including computer program code, wherein the computer program code, when executed by operation of the at least one processor, causes the work machine management system to:
determine with a determination unit whether the position detecting device is capable of accurately determining a position;
accumulate information for new map data on existence and a position of the object existing in the workplace on the basis of detection data obtained by the position detecting device and detection data obtained by the non-contact sensor, when the position detecting device is determined to be accurate;

wherein new map data in each grid in an area of the map data is a grid color based on a number of times that the object has been detected in the grid by the work machine as it has traveled on a travel route in the workplace;

identify with an identifying unit-perfection of map data in accordance with a ratio between a colored grid and a non-colored grid in an area of the map data;

calculate with a scan matching navigation position calculation unit a position of the work machine by matching a detection result obtained by the non-contact sensor with the map data;

control with a travel controller travel of the work machine on the basis of a detection result obtained by the position detecting device in a case where the position detecting device is effective, and configured to control travel of the work machine on the basis of a calculation result obtained by the scan matching navigation position calculation unit in a case where the position detecting device is not effective, generate with a travel route generation unit a travel route that causes the work machine to pass the travel route both in the case where the position detecting device is effective and in the case where the position detecting device is not effective, wherein the map data allows a position of the work machine to be calculated by matching the map data with the detection data obtained by the non-contact sensor, and in a case where the perfection of the map data is low, a travel route is generated that is located in an outer periphery in vicinity of the workplace included in a detection area by the non-contact sensor.

* * * * *